(12) United States Patent
Moskovich

(10) Patent No.: US 7,002,753 B2
(45) Date of Patent: Feb. 21, 2006

(54) COLOR-CORRECTED PROJECTION LENSES FOR USE WITH PIXELIZED PANELS

(75) Inventor: Jacob Moskovich, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/858,777

(22) Filed: Jun. 2, 2004

(65) Prior Publication Data
US 2005/0270657 A1 Dec. 8, 2005

(51) Int. Cl.
*G02B 3/00* (2006.01)
(52) U.S. Cl. .................................. 359/649; 359/651
(58) Field of Classification Search ........ 359/649–651, 359/749–753
See application file for complete search history.

(56) References Cited

U.S. PATENT DOCUMENTS

| | | | |
|---|---|---|---|
| 5,042,929 A | 8/1991 | Tanaka et al. | 359/708 |
| 5,218,480 A | 6/1993 | Moskovich | 359/753 |
| 5,625,495 A | 4/1997 | Moskovich | 359/663 |
| 5,710,669 A | 1/1998 | Endo | 359/686 |
| 5,812,326 A | 9/1998 | Yamada | 359/749 |
| 5,822,129 A * | 10/1998 | Sekine | 359/651 |
| 5,900,989 A * | 5/1999 | Kreitzer | 359/691 |
| 5,963,375 A * | 10/1999 | Kreitzer | 359/650 |
| 6,195,209 B1 | 2/2001 | Kreitzer et al. | 359/649 |
| 6,273,570 B1 | 8/2001 | Clifton et al. | 353/74 |
| 6,324,014 B1 | 11/2001 | Moskovich | 359/651 |
| 6,476,974 B1 | 11/2002 | Kreitzer | 359/649 |
| 6,765,731 B1 | 7/2004 | Cannon | 359/793 |
| 6,853,493 B1 | 2/2005 | Kreitzer | 359/651 |
| 2002/0141072 A1 | 10/2002 | Moskovich | 359/663 |
| 2003/0011895 A1 | 1/2003 | Mori | 359/749 |

FOREIGN PATENT DOCUMENTS

WO WO 99/26090 5/1999

OTHER PUBLICATIONS

Dunham, C.B., and C.R. Crawford, "Minimax Approximation by a Semi-Circle," Society for Industrial and Applied Mathematics, vol. 17, No. 1, Feb., 1980, pp. 63-65.
U.S. Appl. No. 10/858,785, entitled "Large-Panel Table-Top Rear Projection Television" filed Jun. 2, 2004 as our Docket No. 58778US002.

(Continued)

*Primary Examiner*—Georgia Epps
*Assistant Examiner*—M. Hasan
(74) *Attorney, Agent, or Firm*—George W. Jonas

(57) ABSTRACT

Projection lenses for use with pixelized panels (PP) are provided. The projection lenses have first and second lens units (U1,U2), with the first lens unit having a negative power and the second lens unit having a positive power. The first lens unit has a first lens element (L1) having a generally meniscus shape and a second lens element (L2) having a biconcave shape when its surface configurations are described by best fit spherical surfaces. The second lens element (L2) has an Abbe number ($v_{L2}$) which is (a) less than or equal to 55 and (b) less than the Abbe number ($V_{L1}$) of the first lens element (L1). The second lens element (L2) also has an optical power ($\phi_{L2/0.7CA}$) at 0.7 of the clear aperture of its short conjugate surface which is negative and has a magnitude which is greater than the second lens element's on-axis optical power ($\phi_{L2}$). This combination of lens shapes, Abbe numbers, and optical powers provides higher order lateral color correction without the need for abnormal partial dispersion glasses.

25 Claims, 7 Drawing Sheets

OTHER PUBLICATIONS

U.S. Patent Application Serial No. 10/858786, entitled "Compact Projection Lenses for use with Large Format Pixilized Panel", Attorney Docket No. 58965US002, filed on Jun. 2, 2004.

* cited by examiner

COLOR-CORRECTED PROJECTION LENSES FOR USE WITH PIXELIZED PANELS

FIELD OF THE INVENTION

This invention relates to projection lenses and, in particular, to projection lenses for use in forming an image of an object composed of pixels, such as, a DMD, a reflective LCD, a transmissive LCD, or the like. The lenses are particularly well-suited for use with large format transmissive LCDs, e.g., LCDs having a diagonal on the order of 10 inches (250 millimeters) or more.

BACKGROUND OF THE INVENTION

A. Definitions

As used in this specification and in the claims, the following terms shall have the following meanings:

(1) Optical Component

An optical component is a component which has optical power and/or corrects one or more monochromatic and/or one or more chromatic aberrations and which requires separate mounting and alignment from other components of the projection lens.

As illustrated by the examples present below, optical components include, for example, single lens elements and cemented doublets. Projection lenses having less optical components are preferred to projection lenses having more optical components because having less components simplifies assembly and generally results in a reduction in a projection lens' weight and component cost.

(2) Barrel Length

Barrel length (BRL) is the distance between the vertex of the front surface of the forward-most optical component of the projection lens and the vertex of the back surface of the rearward-most optical component.

(3) Off-Axis Power of an Aspherical Lens Element

The power of an aspherical lens element at an off-axis position, e.g., at a position y equal to 0.7 times the clear aperture of the lens element's short conjugate surface, is given by:

$$\phi_y = (n-1)(C1y - C2y)$$

where n is the index of refraction of the lens element (specifically, the index of refraction at 546.1 nanometers), and $C1\beta$ and $C2\beta$ are, respectively, the local curvatures of the long conjugate and short conjugate surfaces of the lens element at the height y, which, in accordance with conventional practice, are positive when the center of curvature is on the right, e.g., short conjugate, side of the surface.

(4) Best Fit Spherical Surface to an Aspherical Surface

For lens surfaces that are aspheric, in addition to the radius of curvature at the optical axis, the overall shape of the surface and thus of the lens element which comprises the surface can be described in terms of best fit spherical surfaces. As discussed below, in this specification and in the claims, best fit spherical surfaces are used to describe the shape of the L2 lens element.

Procedures for determining best fit spherical surfaces can be found in Dunham, C. B., and C. R. Crawford, "Minimax Approximation by a Semi-Circle," Society for Industrial and Applied Mathematics, Vol. 17, No. 1, February, 1980, pages 63–65. In many cases, the description of a lens element, e.g., as being biconcave, will be the same whether the surfaces of the element are described in terms of best fit spherical surfaces or in terms of the radii of curvature at the optical axis.

(5) Abbe Number

Abbe numbers are calculated using the formula:

$$v = (n_{546.1} - 1)/(n_{480.0} - n_{643.8})$$

where $n_{480.0}$, $n_{546.1}$, and $n_{643.8}$ are the indices of refraction of the optical material at 480.0, 546.1, and 643.8 nanometers, respectively.

B. Projection Systems

Image projection systems are used to form an image of an object, such as a display panel, on a viewing screen. Such systems can be of the front projection or rear projection type, depending on whether the viewer and the object are on the same side of the screen (front projection) or on opposite sides of the screen (rear projection).

FIG. 14 shows in simplified form the basic components of an image projection system 17 for use with a pixelized imaging device (also known in the art as a "digital light valve"). In this figure, 10 is an illumination system, which comprises a light source 11 and illumination optics 12 which transfer some of the light from the light source towards the screen, 13 is the imaging device, and 14 is a projection lens which forms an enlarged image of the imaging device on viewing screen 15. For front projection systems, the viewer will be on the left side of screen 15 in FIG. 14, while for rear projection systems, the viewer will be on the right side of the screen.

For ease of presentation, FIG. 14 shows the components of the system in a linear arrangement. For a transmissive LCD imaging device and, in particular, for a rear projection system employing a large format transmissive LCD imaging device of the type with which the present invention will typically be used, the optical path between the imaging device and the screen preferably includes two folds so as to reduce the overall size of the cabinet used to house the system. In particular, a first fold mirror is preferably placed between imaging device 13 and projection lens 14 and a second fold mirror is preferably placed between the projection lens and screen 15.

The linear arrangement shown in FIG. 14 is also modified in the case of a reflective imaging device. Specifically, in this case, the illumination system is arranged so that light from that system reflects off of the imaging device, i.e., the light impinges on the front of the imaging device as opposed to the back of the device as shown in FIG. 14. Also, for such imaging devices, one or more prism assemblies will be located in front of the imaging device and will receive illumination light from the illumination system and will provide imaging light to the projection lens.

Image projection systems preferably employ a single projection lens which forms an image of: (1) a single imaging device which produces, either sequentially or simultaneously, the red, green, and blue components of the final image; or (2) three imaging devices, one for red light, a second for green light, and a third for blue light. Rather than using one or three imaging devices, some image projection systems have used two or up to six imagers. Also, for certain applications, e.g., large image rear projection systems, multiple projection lenses are used, with each lens and its associated imaging device(s) producing a portion of the overall image. In the preferred embodiments of the present invention, a single projection lens is used to form an image of a single imaging device, e.g., a large format transmissive LCD panel.

A particularly important application of projection systems employing pixelized panels is in the area of rear projection systems which can be used as large screen projection televisions (PTVs) and/or computer monitors. To compete effectively with the established cathode ray tube (CRT) technology, projection systems based on pixelized panels need to be smaller in size and lower in weight than CRT systems having the same screen size.

C. Optical Performance

To display images having a high information content (e.g., to display data), a projection lens needs to have a high level of aberration correction. In particular, the lens needs to have a high level of resolution across the entire field of the lens and a high-level of chromatic aberration correction.

A high level of resolution is needed because good image quality is required even at the extreme points of the field of view of the lens when viewing data. As will be evident, a clear, undistorted image of a displayed number or letter is just as important at the edge of the field as it is at the center.

A high level of chromatic aberration correction is important because color aberrations can be easily seen in the image of a pixelized panel as a smudging of a pixel or, in extreme cases, the complete dropping of a pixel from the image. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing CRTs a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

High resolution and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of resolution loss or color aberration in the images of such interfaces.

D. Cabinet Size

For rear projection systems, there is an ever increasing demand for smaller cabinet sizes (smaller footprints). In terms of the projection lens, this translates into a requirement that the lens has a wide field of view (FOV) in the direction of the image (screen). The requirement for a large FOV makes it even more difficult to correct the lateral color of the lens.

In addition to a large FOV in the direction of the lens' long conjugate, when used with a large format pixelized panel, the projection lens also needs to have a relatively large FOV in the direction of its short conjugate. However, such short conjugate FOV must not be so large as to compromise the transmission of light through the Fresnel lens typically used on the projection lens side of a transmissive LCD panel.

Achieving wide fields of view in the direction of the lens' long and short conjugates, while still maintaining high levels of aberration correction, is technically challenging. To do so while minimizing the size of the projection lens and the number of optical components used in the lens is even more demanding. As illustrated by the examples presented below, the present invention in its preferred embodiments provides projection lenses which simultaneously satisfy these competing design criteria.

SUMMARY OF THE INVENTION

In accordance with a first aspect, the invention provides a retrofocus lens having a long conjugate side, a short conjugate side, and an effective focal length $f_0$, said lens, in order from the long conjugate side to the short conjugate side, comprising:

(I) a first lens unit (U1) having a negative power, said lens unit, in order from the long conjugate side to the short conjugate side, comprising:
 (A) a first lens element L1 composed of an optical material having an Abbe number $v_{L1}$, said element having at least one aspherical surface and an on-axis optical power $\phi_{L1}$; and
 (B) a second lens element L2 composed of an optical material having an Abbe number $v_{L2}$, said element having at least one aspherical surface and an on-axis optical power $\phi_{L2}$; and
(II) a second lens unit (U2) having a positive power; wherein:
 (a) the first and second lens units are the only lens units of the retrofocus lens;
 (b) the first lens element L1 has a generally meniscus shape which is convex towards the long conjugate;
 (c) the second lens element L2 has a biconcave shape when its surface configurations are described by best fit spherical curves;
 (d) $\phi_{L1}$, $v_{L1}$, $\phi_{L2}$, and $v_{L2}$ satisfy the relationships:
  (i) $\phi_{L1}<0$;
  (ii) $|\phi_{L1}|>|\phi_{L2}|$;
  (iii) $v_{L2}<v_{L1}$; and
  (iv) $v_{L2}\leq 55$; and
 (e) the at least one aspherical surface of the second lens element L2 is configured so that the element has an optical power $\phi_{L2/0.7CA}$ at 0.7 of the clear aperture of its short conjugate surface which satisfies the relationships:
  $\phi_{L2/0.7CA}<0$, and
  $|\phi_{L2/0.7CA}|>|\phi_{L2}|$.

In certain embodiments, the power of the second lens element (L2) is negative.

In other embodiments:
 (a) the lens comprises an aperture stop (AS);
 (b) the second lens unit (U2), in order from the long conjugate side to the short conjugate side, comprises a first lens subunit (U2S1) having an optical power $\phi_{U2/S1}$ and a second lens subunit (U2S2) having an optical power $\phi_{U2/S2}$, said subunits being the only lens subunits of the second lens unit;
 (c) the aperture stop is either within the first lens subunit or is outside of that subunit and spaced from the subunit by an axial distance D, said distance being measured from the lens surface of the first lens subunit that is nearest to the aperture stop;
 (d) the second lens subunit (U2S2) comprises:
  (i) at least one color-correcting component; and
  (ii) a lens element L3 having at least one aspherical surface; and
 (e) $\phi_{U2/S1}$, $\phi_{U2/S2}$, and D satisfy the relationships:
  (i) $\phi_{U2/S1}>0$;
  (ii) $\phi_{U2/S1}>|\phi_{U2/S2}|$; and
  (iii) $|D|/f_0 \leq 0.2$ (preferably: $D/f_0<0.1$).

The first lens subunit (U2S1) of the second lens unit (U2) can comprise a single lens element, the color correcting component of the second lens subunit (U2S2) of the second lens unit (U2) can be a cemented doublet, and/or the L3 element can have a focal length $f_{L3}$ which preferably satisfies the relationship:

$|f_{L3}|/f_0 \geq 1.5$ (more preferably: $|f_{L3}|/f_0 \geq 2.0$).

The retrofocus lens preferably satisfies some and most preferably all of the following relationships:

(1) $FOV_{LC} \geq 85°$ (more preferably: $FOV_{LC} \geq 90°$);
(2) $FOV_{SC} \geq 50°$ (more preferably: $FOV_{SC} \geq 55°$);
(3) $BRL/f_0 \leq 1.7$ (more preferably: $BRL/f_0 \leq 1.5$); and/or
(4) $CA_{max}/f_0 \leq 1.3$ (more preferably: $CA_{max}/f_0 \leq 11.1$);

where $FOV_{LC}$ and $FOV_{SC}$ are the full field of views in the directions of the long and short conjugates, respectively, and $CA_{max}$ is the lens' maximum clear aperture, i.e., the maximum clear aperture of all of the optical components of the lens.

The retrofocus lens also preferably employs five optical components and six lens elements.

In accordance with a second aspect, the invention provides a projection lens system which comprises a retrofocus lens (projection lens) in accordance with the first aspect of the invention and a pixelized panel (PP) which, preferably, has a diagonal which is greater than 250 millimeters. In accordance with this aspect, the projection lens system can comprise a Fresnel lens (FL) between the pixelized panel and the retrofocus lens.

The reference symbols used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention, and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification.

DESCRIPTION OF THE PREFERRED EMBODIMENTS

Figure 1:
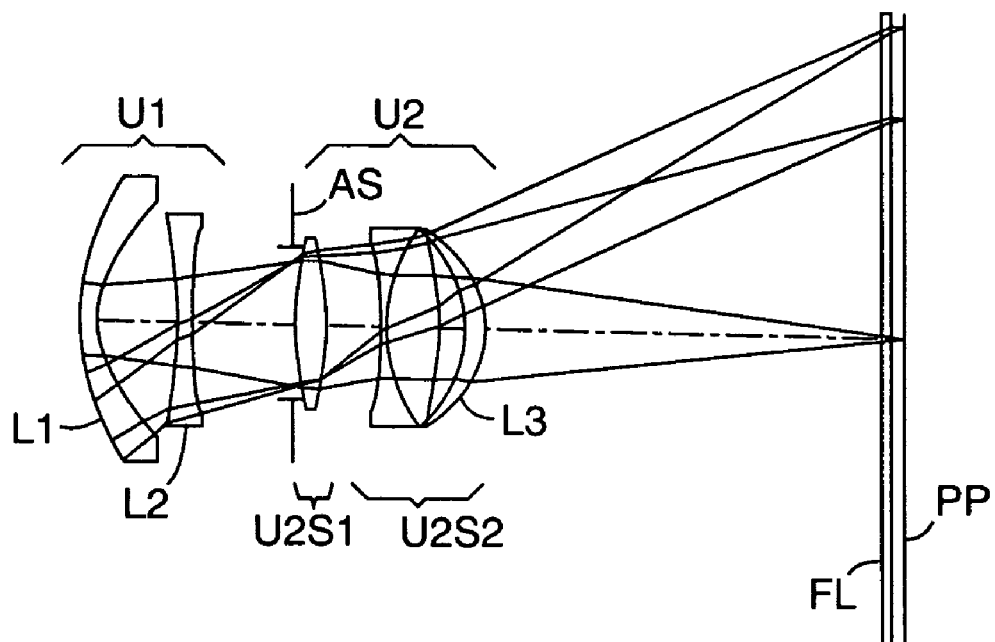
FIGS. 1 through 13 are schematic side views of representative retrofocus lenses constructed in accordance with the invention.

As discussed above, in accordance with certain of its aspects, the present invention provides retrofocus lenses suitable for use in rear projection televisions wherein the imaging device employed in the television is a large format pixelized panel, e.g., a large format transmissive LCD panel.

The first order form of the lens is that of a retrofocus wide angle imaging lens, with a large field angle in the long conjugate direction, e.g., a field angle greater than or equal to 85 degrees, and a smaller field angle in the short conjugate direction, e.g., a field angle greater than or equal to 50°. The lenses can be used with, for example, rear-projection screens that are sized between 42 and 70 inches diagonal, and with LCD imagers of sizes from 10 inch to inch diagonal. In such applications, a primary fold mirror can be located between the large screen and the lens, and another fold mirror between the lens and the LCD imager.

Transmissive LCD imagers generally operate with telecentric light on both sides, i.e., on the illumination side and on the screen display side, so preferably there is a Fresnel lens on both sides of the LCD—one for the imaging side and one for the projection lens side. To achieve efficient light transmission through the Fresnel lens located on the screen side of the LCD, the field angle of the projection lens is preferably kept below about 70° in the short conjugate direction. In this way, high loss of light from interference with the risers of the Fresnel lens is avoided.

One of the very important characteristics of projection lenses used in tear projection TV sets or monitors which are based on projecting a single large color LCD panel is the overall package size. As discussed in commonly-assigned U.S. patent application Ser. No. 10/858,785, entitled "Large-Panel Table-Top Rear Projection Television," the contents of which are incorporated herein by reference, rear projection imaging systems employing the retrofocus lenses of the present invention can have cabinet sizes that are more compact than one would expect from the components contained in them. In particular, the lenses of the invention contribute to small cabinet sizes by having relatively short barrel lengths, e.g., barrel lengths that are less than or equal to 1.7 times the focal length of the lens. Because of their retrofocus structure, the lenses also provide a sufficiently long back focal length to accommodate a folding mirror between the lens and the LCD panel. With such a mirror in place the overall package size can be substantially reduced.

The light transmission characteristics through a typical color LCD panel indicate that the f-number of a projection lens used to image such a panel need not be any faster than approximately f/3.5–f/4. A panel's individual pixel size dictates the level of correction of aberrations of the lens, and is typically around 0.1 mm to 0.17 mm, depending on the resolution and the size of the panel. It is also very important to keep the overall cost of the lens at a minimum while still satisfying the optical performance requirements.

The lenses of the invention allow the above requirements to be met in a simple economical configuration. As indicated above, the lenses have an overall retrofocus structure. In particular, the lenses comprise two lens units, with the first unit (U1) on the long conjugate side of the lens having a negative power and the second unit (U2) on the short conjugate side having a positive power.

The first unit (U1) includes at least two aspherical elements—a first element (LI) of negative power $\phi_{L1}$ and having a generally meniscus shape, and a second element (L2) having an optical power $\phi_{L2}$ weaker than $\phi_{L1}$ ($|\phi_{L1}| > |\phi_{L2}|$) and having a generally biconcave shape, with the off-axis power of the element, specifically, the power at 0.7 times the clear aperture of the element's short conjugate surface, being negative and stronger than the corresponding power on axis.

Figure 2:
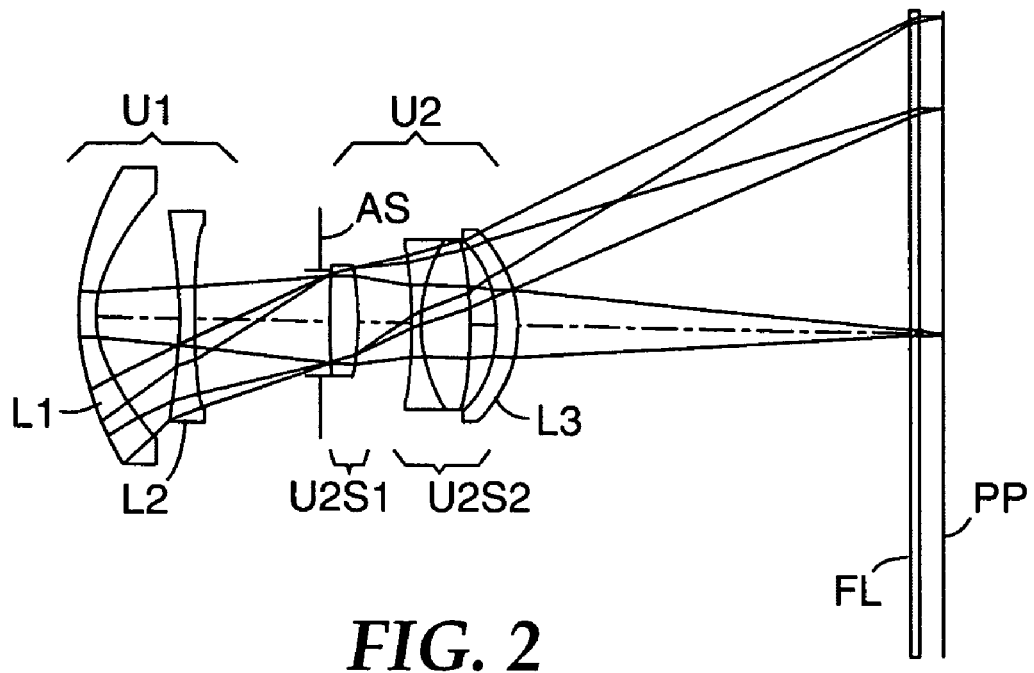
Figure 3:
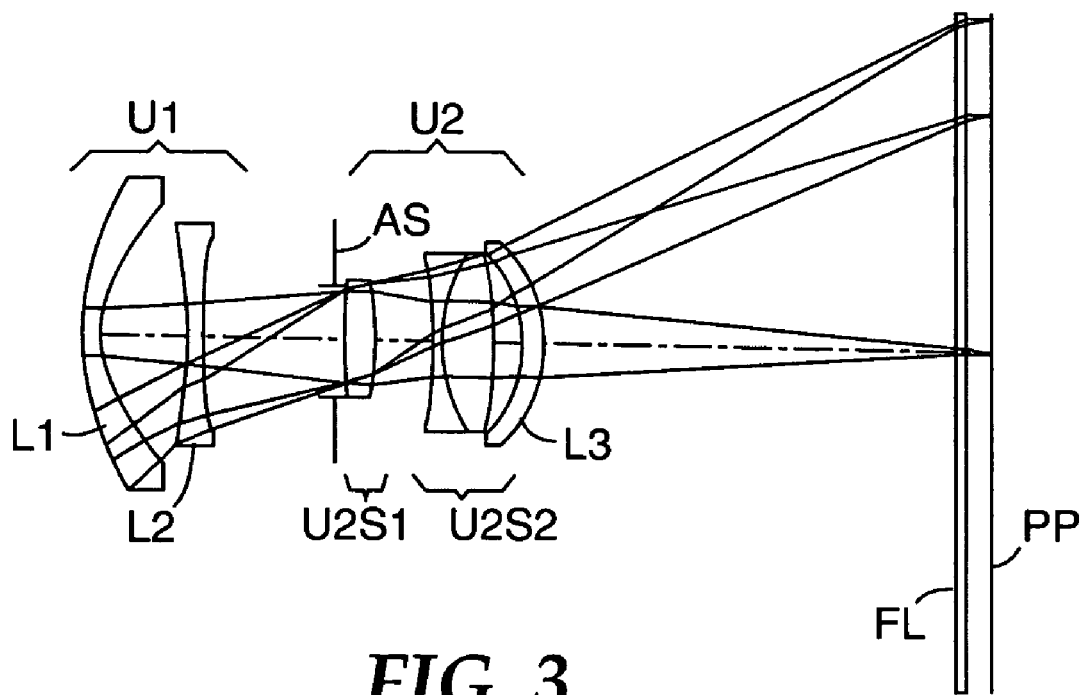
Figure 4:
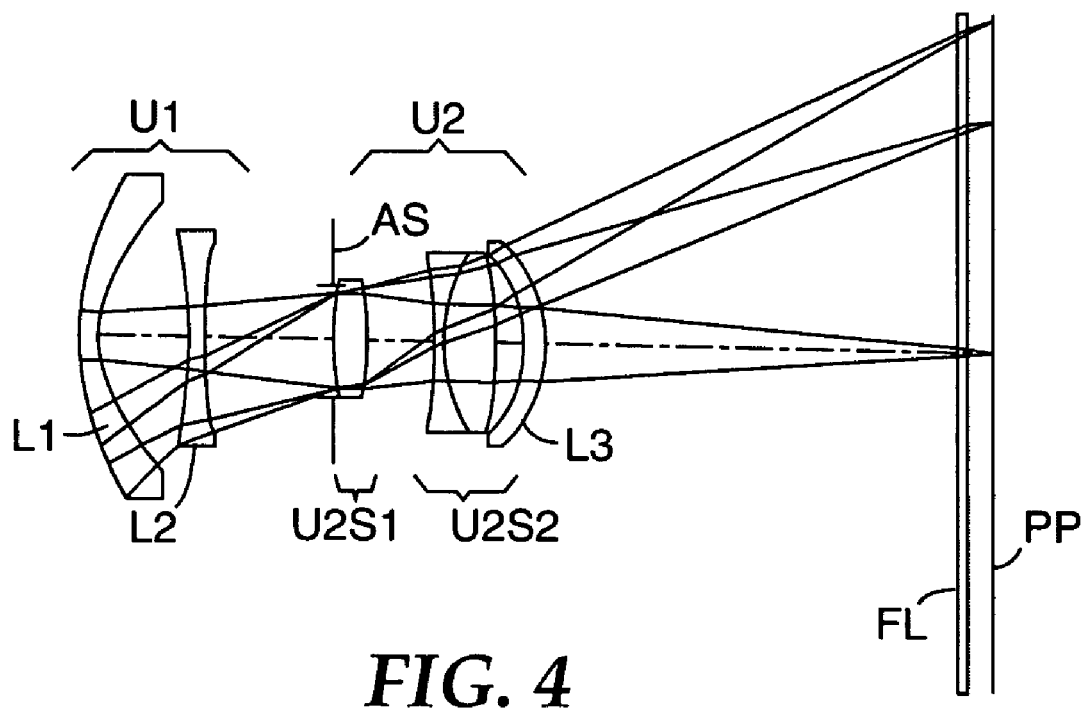
Figure 5:
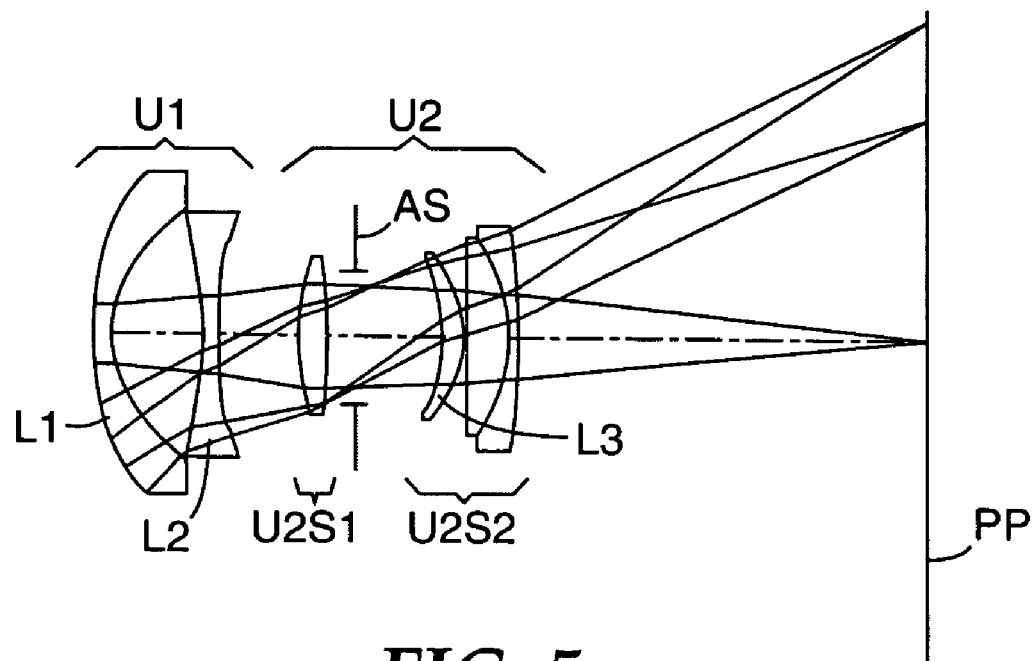
Figure 6:
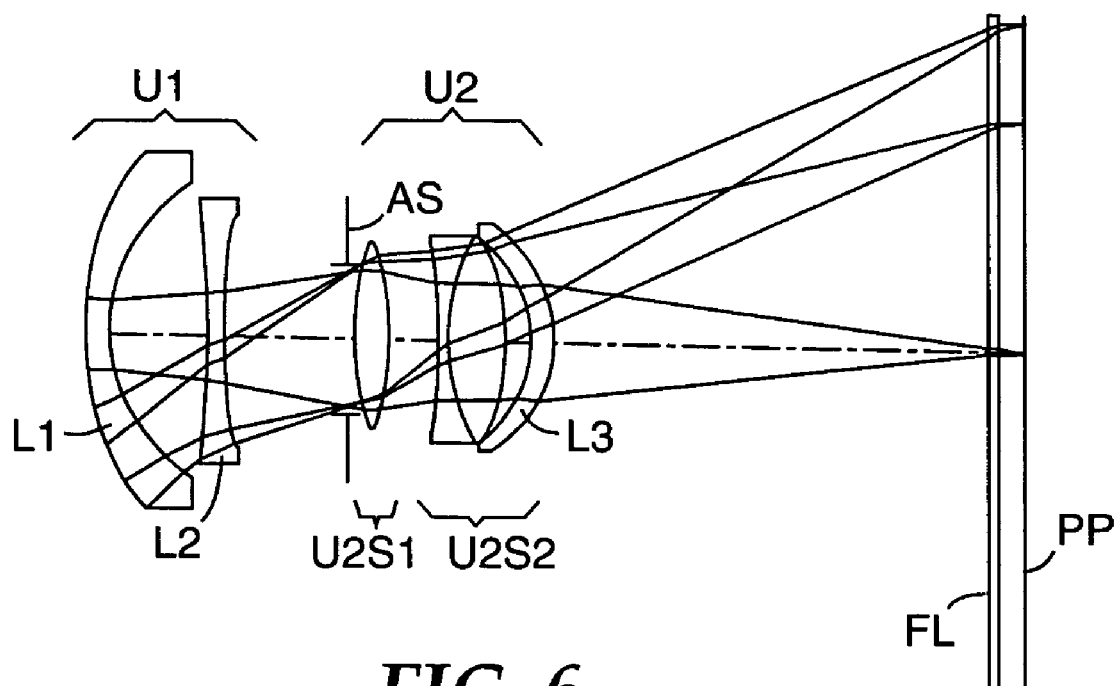
Figure 7:
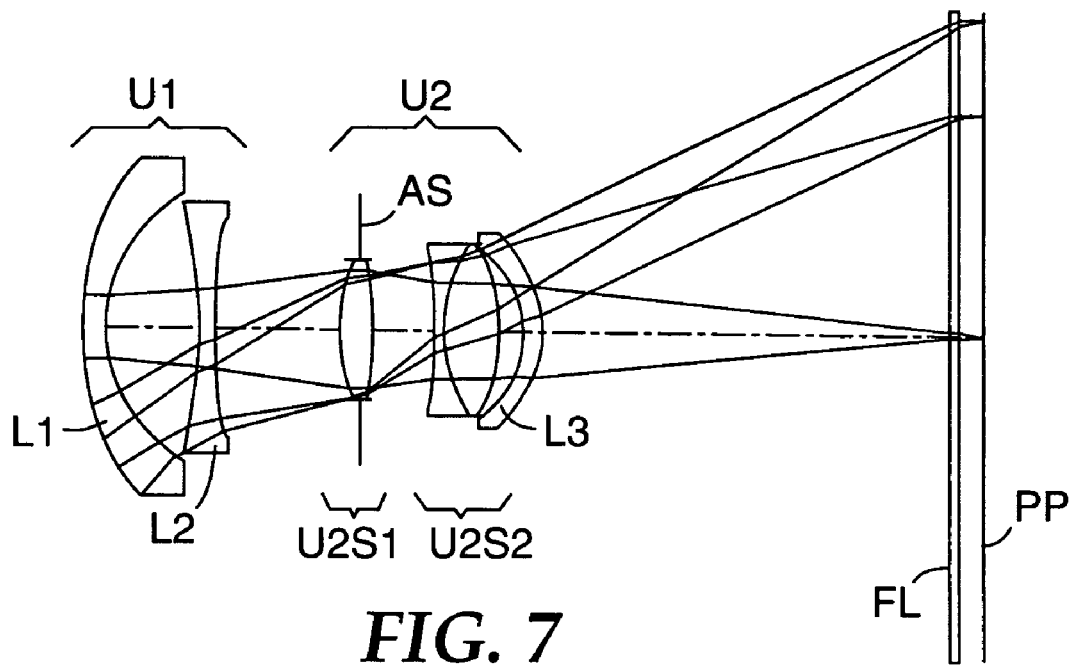
Figure 8:
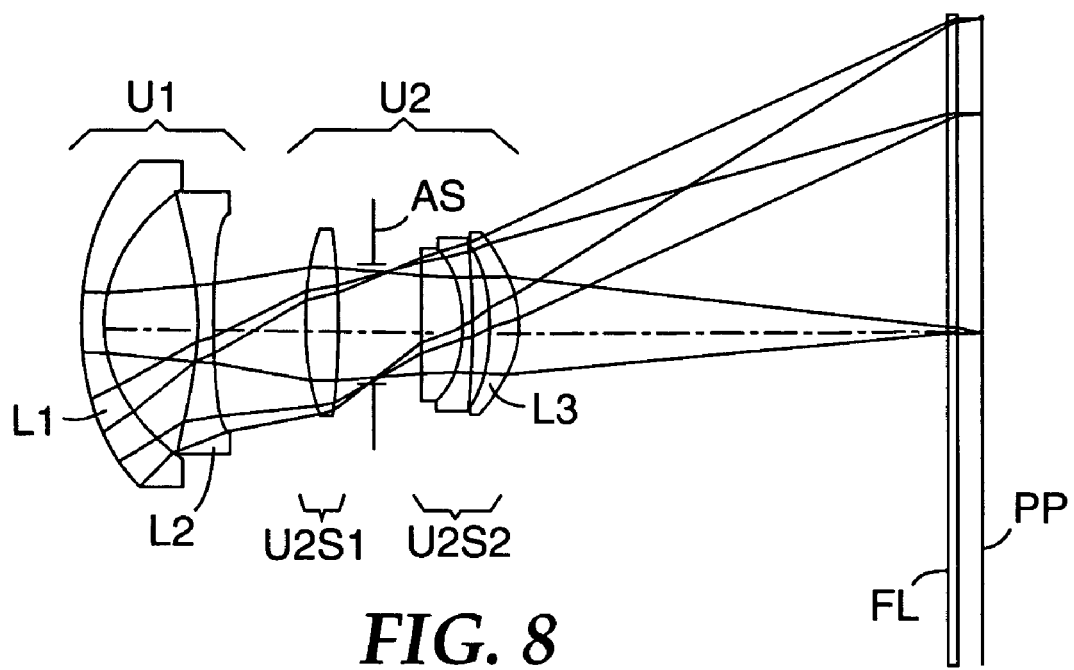
Figure 9:
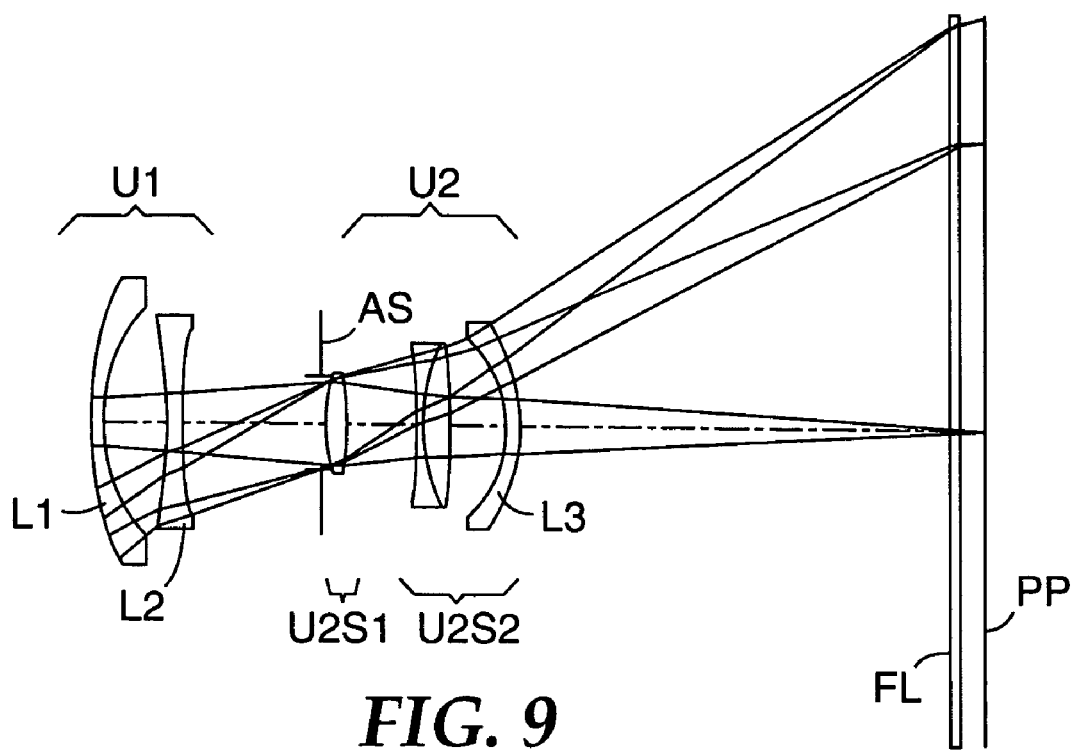
Figure 10:
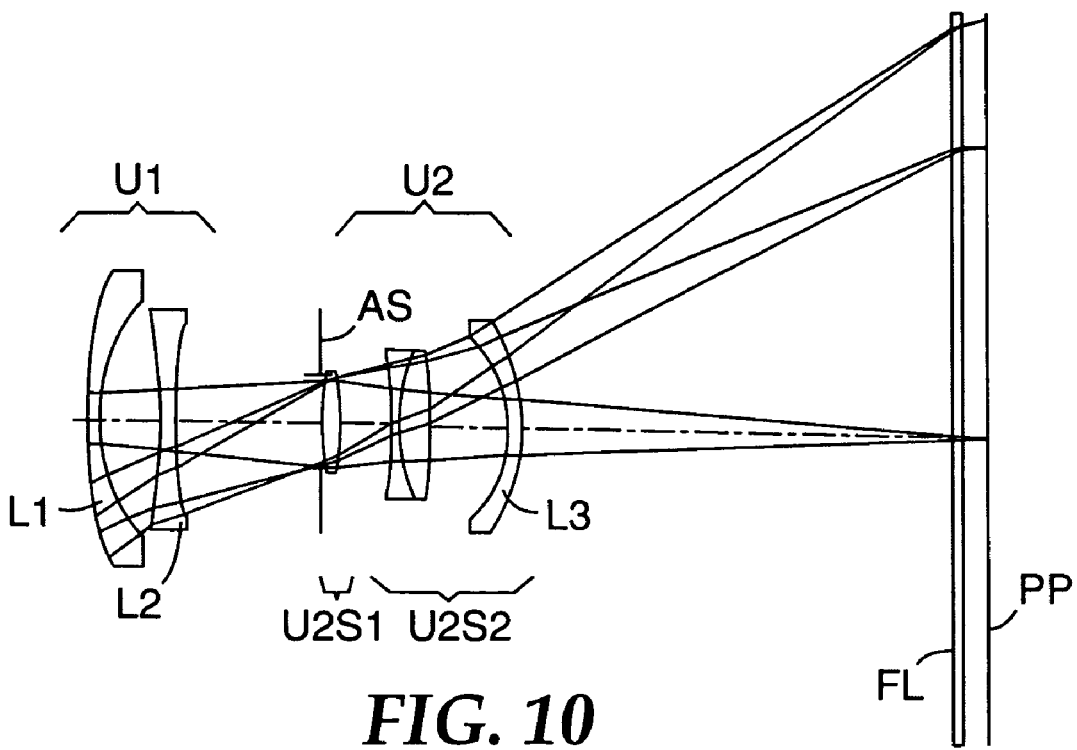
Figure 11:
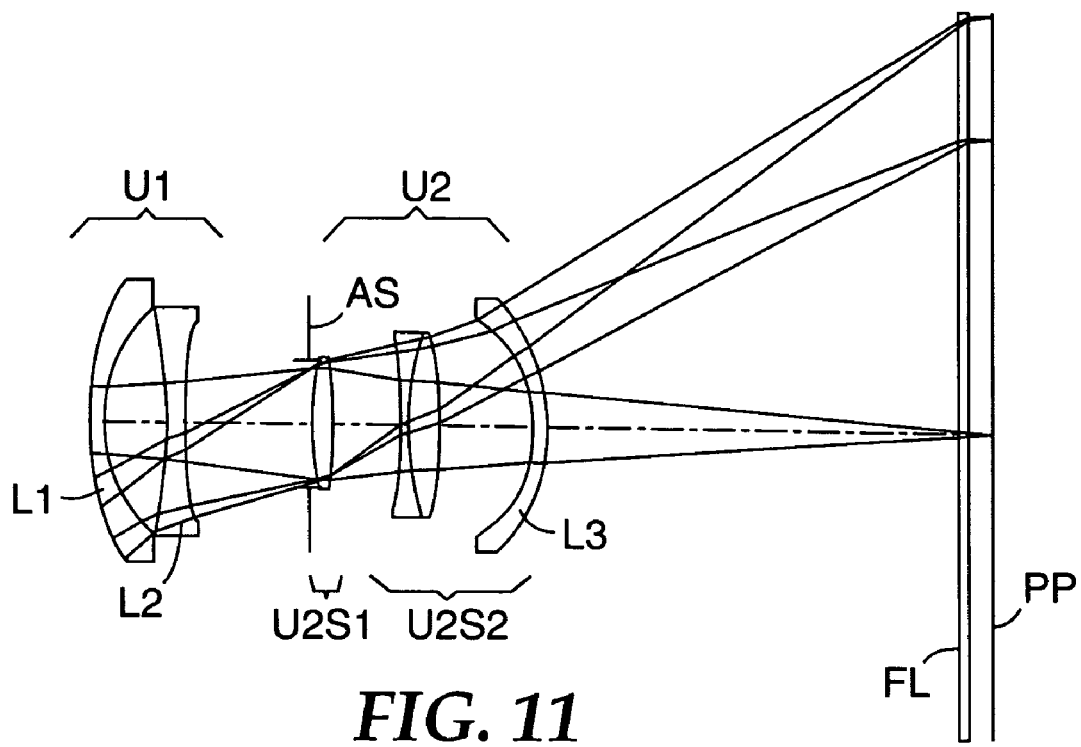
Figure 12:
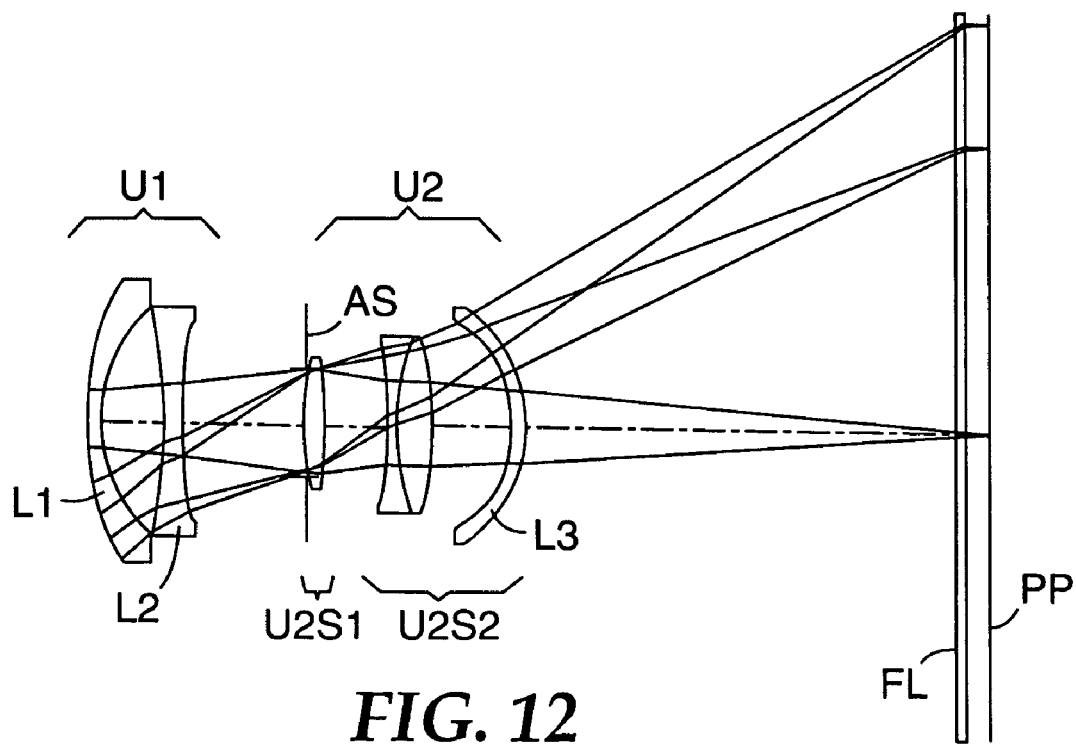
Figure 13:
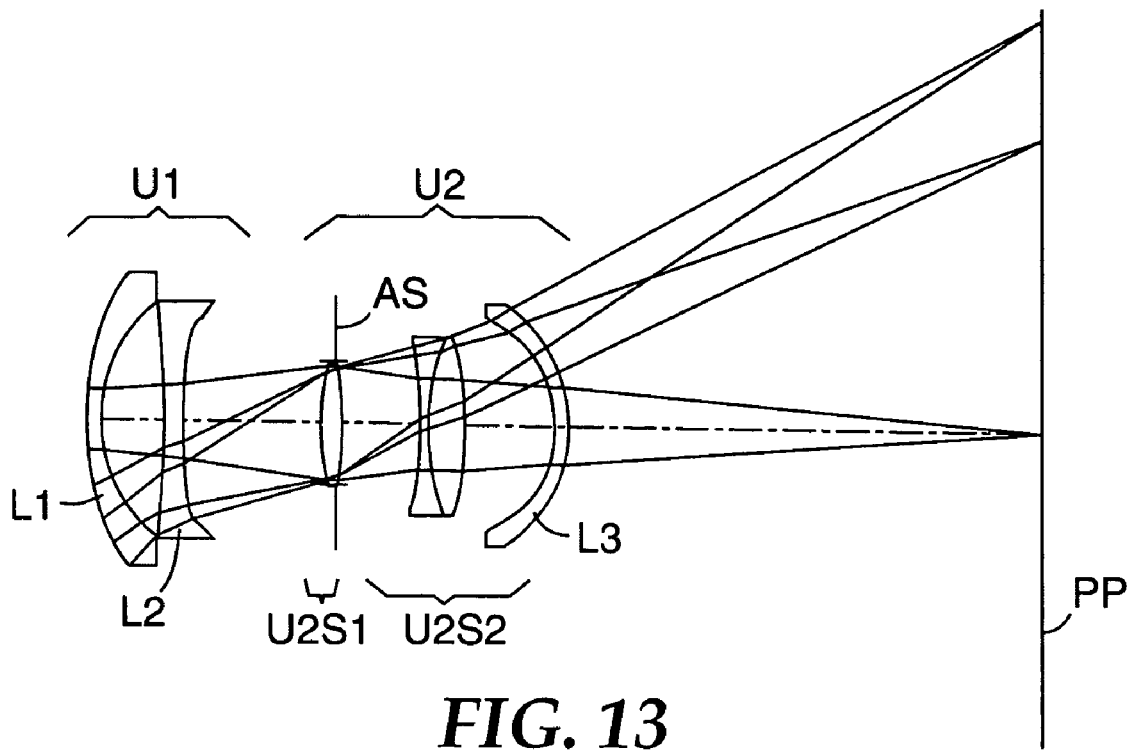
Figure 14:
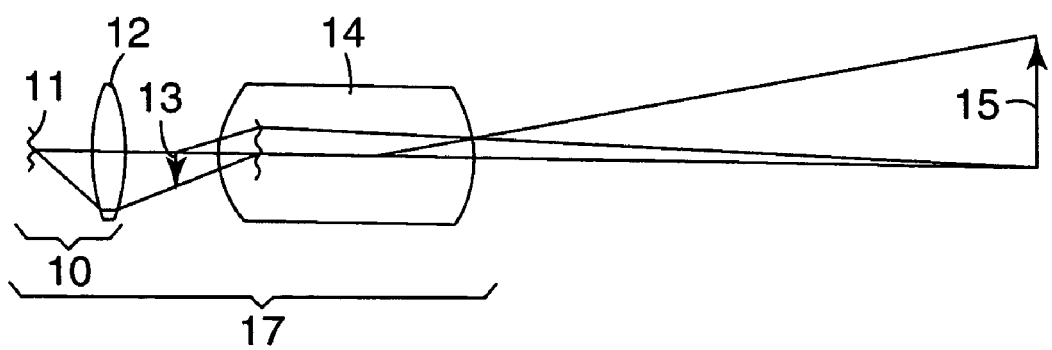
FIG. 14 is a schematic diagram showing an overall projection lens system in which the retrofocus lenses of the present invention can be used.

As shown in FIGS. 1–13, the first lens element is not purely meniscus, but becomes thicker in the region of the element's clear aperture. The lens element is thus described herein and in the claims as having a "generally meniscus shape." Similarly, the second lens element is not purely biconcave but can be, for example, meniscus shaped or even biconvex at the optical axis. However, when described by best fit spherical surfaces, the long conjugate surface of the second lens element has a negative radius of curvature and the short conjugate surface of that element has a positive radius of curvature, so that the overall lens has a biconcave shape (see, for example, the R1L2 and R2L2 values in Table 17).

The second lens unit (U2) can be composed of two subunits—a positive power subunit (U2S1) with an aperture stop in close proximity and a weaker power subunit (U2S2) including a color-correcting component and an aspherical element (L3). The color-correcting component can be, for example, a cemented doublet which includes a positive lens element and a negative lens element, with the positive lens element having a lower dispersion (higher Abbe number) than the negative lens element, e.g., the positive lens element can be made of a crown glass and the negative lens element can be made of a flint glass.

The asymmetry of the retrofocus form causes a particular problem with correction of distortion and lateral color. Use of aspherical surfaces in the front unit of the lens allows for a very good correction of distortion even for fields of view in the direction of the long conjugate that are equal to or greater than 85°.

Typically, while the primary lateral color can be corrected well with ordinary type glasses, the higher order lateral color, sometimes referred to as chromatic variation of distortion, is much more difficult to correct. One of the techniques used in projection lenses to obtain a necessary level of correction of that aberration involves the use of abnormal dispersion optical materials. This, however, may lead to a substantial increase in the cost of the projection lens, especially considering the size of the individual elements of the lens.

To achieve a better correction of lateral color without resorting to the use of expensive optical glasses, in accordance with the invention, a weaker second element (L2) in the first unit is made out of a high dispersion material, specifically, a material having an Abbe number less than or equal to 55. Also, this element is configured so that its has an off-axis power which (a) is negative and (b) has a magnitude that is greater than the element's on-axis power. Specifically, as discussed above, L2 is configured to have these properties at 0.7 times the clear aperture of the element's short conjugate surface.

The second lens unit (L2) can have an aspherical element (L3) as part of its second subunit (U2S2). This element serves predominantly as a corrector element to facilitate the correction of coma, field curvature and astigmatism, as well as to provide residual correction of spherical aberration. The overall power of the corrector element is kept relatively low to achieve a form factor necessary to maintain the cost of the element at a minimum.

As discussed above, the use of aspherical surfaces in the first and second lens units allows for better correction of the aberrations of the projection lens. In this way, a sufficiently high level of correction can be achieved with a minimum number of elements. To be able to make the aspherical elements economically, the elements are preferably injection molded out of plastic optical materials. The molding process is most economical when the edge-to-center element thickness variation is kept smaller than about 3.5:1, preferably smaller than about 3.0:1, and most preferably smaller than about 2.5:1. The configurations of the aspherical surfaces are preferably selected to achieve form factors of this type.

Particularly preferred applications for the retrofocus lenses of the invention are in connection with high resolution LCD panels that have as many as 1080 pixels across the vertical and have separate red-green-blue subpixels. For example, for a panel having a 15 inch (380 mm) diagonal, the pixels are 170 microns across and the subpixels are only 58 microns across. This gives a resolution requirement of ~3000 pixels, with resolution frequencies as high as 8 line pairs/mm. The lenses of the invention readily achieve aberration correction levels sufficient for these resolutions.

Without intending to limit it in any manner, the present invention will be more fully described by the following examples.

EXAMPLES

FIGS. 1–13 and Tables 1–13 illustrate representative retrofocus lenses constructed in accordance with the invention. The lenses of Examples 11–13 were designed for use with pixelized panels having diagonals of 15 inches (380 mm), those of Examples 9–10 for panel diagonals of 13 inches (330 mm), those of Examples 2–4 for panel diagonals of 10 inches (250 mm), and the remainder for use with smaller panels.

OHARA designations are used in the prescriptions of Tables 1–13 for the various glasses employed in the lens systems. Equivalent glasses made by other manufacturers (e.g., HOYA or SCHOTT) can be used in the practice of the invention. Industry acceptable materials are used for the plastic elements. The designation NAS refers to a 70:30 copolymer of polystyrene and acrylic.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–13.

The designation "a" associated with various surfaces in the tables represents an aspherical surface, i.e., a surface for which at least one of D, E, F, G, H, or I in the above equation is not zero; the designation "c" indicates a surface for which k in the above equation is not zero; and the designation "f" indicates a Fresnel surface.

The Fresnel lens (FL) located on the short conjugate side of U2 in various of the figures is used with or is part of the pixelized panel (PP) and is not considered part of the retrofocus lens. Its optical power is not included in the calculation of the $f_0$ values set forth in Table 14. Similarly, it is not included in the $f_{L3}/f_0$, BRL/$f_0$, and CA$_{max}$/$f_0$ ratios of Table 15.

The prescription tables are constructed on the assumption that light travels from left to right in the figures. In actual practice, the viewing screen will be on the left and the pixelized panel will be on the right, and light will travel from right to left. In particular, the references in the prescription tables to objects/images and entrance/exit pupils are reversed from that used in the rest of the specification. The aperture stop is shown in FIGS. 1–13 by the designation "AS".

All dimensions given in Tables 1–14 are in millimeters except where other units are indicated. The R1L2 and R2L2 values in Table 17 are also in millimeters.

Tables 14 through 18 summarize various properties of the lenses of Examples 1–13. In particular, Table 15 shows that for each of these examples, $|f_{L3}|/f_0 \geq 1.5$ (and, in most cases $\geq 2.0$), $BRL/f_0 \leq 1.7$ (and, in most cases, $\leq 1.7$), and $C_{max}/f_0 \leq 1:3$ (and, in most cases, $\leq 1.1$); Table 16 shows that $v_{L2} \leq 55$ and $v_{L2} < v_{L1}$; and Table 17 shows that the edge thickness ($t_e$) to center thickness ($t_c$) ratio for aspheric lens elements L1, L2, and L3 are less than or equal to 3.5 (and, in many cases, less than or equal to 2.5). The edge thickness values used in these calculations are determined at the lens element's smaller clear aperture, e.g., at surface 2 for the L1 element. A comparison of the $\phi_{L2/0.7CA}$ values of Table 17 with the corresponding on-axis powers of the L2 element set forth in Tables 1–13 shows that for each example, $|\phi_{L2/0.7CA}| > |\phi_{L2}|$. Finally, Table 18 shows that the $FOV_{LC}$ and $FOV_{SC}$ values are greater than 85° and 50°, respectively, for each of the examples.

As illustrated by these examples, the retrofocus lenses of the invention are well-suited to the manufacture of compact, light weight, projection televisions and monitors which employ pixelized panels.

Although specific embodiments of the invention have been described and illustrated, it is to be understood that a variety of modifications which do not depart from the scope and spirit of the invention will be evident to persons of ordinary skill in the art from the foregoing disclosure. As just one example, although the preferred application for the lenses of the invention is as projection lenses, they can also be used in other applications, e.g., as taking lenses.

TABLE 1

| Surf. No. | Type | Radius | Thickness | Glass | Clear Aperature Diameter |
|---|---|---|---|---|---|
| 1 | a | 92.8652 | 4.93053 | ACRYLIC | 81.92 |
| 2 | ac | 36.8568 | 22.21431 | | 66.79 |
| 3 | a | −137.4044 | 3.94442 | STYRENE | 59.54 |
| 4 | a | 36825.7300 | 28.02358 | | 52.49 |
| 5 | | Aperture stop | 1.00000 | | 41.88 |
| 6 | | 76.5188 | 9.00000 | S-LAH60 | 45.07 |
| 7 | | −100.4771 | 14.94570 | | 45.93 |
| 8 | | −118.6745 | 2.10369 | S-TIH6 | 48.11 |
| 9 | | 42.3008 | 15.00000 | S-BAL2 | 51.65 |
| 10 | | −116.9366 | 7.56015 | | 53.64 |
| 11 | a | −40.1673 | 5.58793 | ACRYLIC | 52.46 |
| 12 | ac | −31.3642 | 111.31700 | | 55.32 |
| 13 | | ∞ | 3.28702 | ACRYLIC | 180.00 |
| 14 | cf | 85.4625 | 5.00110 | | 180.00 |

Symbol Description a - Polynomial asphere
c - Conic section
f Fresnel
Conics

| Surface Number | Constant |
|---|---|
| 2 | −3.9547E − 02 |
| 12 | −7.2657E − 01 |
| 14 | −1.0000E + 00 |

Even Polynomial Aspheres

| Surf. No. | D | E | F | G | H | I |
|---|---|---|---|---|---|---|
| 1 | 1.6902E − 06 | −1.1881E − 09 | 4.7889E − 13 | 6.0920E − 17 | −1.3247E − 19 | 3.8410E − 23 |
| 2 | 7.9129E − 07 | −3.4931E − 09 | 2.8095E − 12 | −3.3595E − 15 | −4.5331E − 19 | 4.2323E − 22 |
| 3 | −8.5962E − 08 | −9.0279E − 11 | −3.5294E − 13 | 2.2646E − 16 | 6.0150E − 19 | −3.0941E − 22 |
| 4 | 2.8974E − 06 | 4.3473E − 10 | 5.6391E − 13 | 6.3838E − 15 | −1.1068E − 17 | 8.7227E − 21 |
| 11 | −4.6342E − 06 | −7.6732E − 09 | 3.3040E − 12 | 4.4011E − 15 | −3.7987E − 18 | 1.6378E − 20 |
| 12 | −4.2455E − 06 | −2.1250E − 09 | −6.4380E − 12 | 3.9202E − 15 | 1.1611E − 17 | 7.5125E − 22 |

First Order Data

| | | | |
|---|---|---|---|
| f/number | 4.00 | Overall Length | 700.008 |
| Magnification | −0.1757 | Forward Vertex Distance | 233.915 |
| Object Height | −508.00 | Barrel Length | 228.914 |
| Object Distance | −466.092 | Entrance Pupil Distance | 39.9258 |
| Effective Focal Length | 88.7945 | Exit Pupil Distance | −12280.9 |
| Image Distance | 5.00110 | Stop Diameter | 35.489 |
| Stop Surface Number | 5 | Distance to Stop | 0.00 |

First Order Properties of Elements

| Element Number | Surface Numbers | | Power | f |
|---|---|---|---|---|
| 1 | 1 | 2 | −0.78449E − 02 | −127.47 |
| 2 | 3 | 4 | −0.43462E − 02 | −230.08 |
| 3 | 6 | 7 | 0.18874E − 01 | 52.984 |
| 4 | 8 | 9 | −0.26211E − 01 | −38.152 |

TABLE 1-continued

|   |   |   |   |   |
|---|---|---|---|---|
| 5 | 9  | 10 | 0.17833E − 01 | 56.076 |
| 6 | 11 | 12 | 0.41743E − 02 | 239.56 |
| 7 | 13 | 14 | 0.57777E − 02 | 173.08 |

First-Order Properties of Doublets

| Element Number | | Surface Numbers | | Power | f' |
|---|---|---|---|---|---|
| 4 | 5 | 8 | 10 | −0.70107E − 02 | −142.64 |

First Order Properties of the Lens

Power           f'
0.11262E − 01   88.794

First Order Data, Surf 1 To 4

K
−.128726E − 01

First Order Data, Surf 6 To 12

K
0.144168E − 01

First Order Data, Surf 1 To 12

K
0.119508E − 01

TABLE 2

| Surf. No. | Type | Radius | Thickness | Glass | Clear Aperature Diameter |
|---|---|---|---|---|---|
| 1  | a  | 157.2194    | 7.50000   | ACRYLIC | 125.84 |
| 2  | ac | 56.0462     | 34.30089  |         | 101.78 |
| 3  | a  | −241.6705   | 6.0000    | STYRENE | 87.08  |
| 4  | a  | 130747.3000 | 52.59224  |         | 76.58  |
| 5  |    | Aperture stop | 1.85690 |         | 41.98  |
| 6  |    | 107.6616    | 12.00000  | S-LAH60 | 41.53  |
| 7  |    | −156.1136   | 22.64923  |         | 44.54  |
| 8  |    | −217.9475   | 3.20000   | S-TIH6  | 55.42  |
| 9  |    | 68.0229     | 20.00000  | S-FSL5  | 60.20  |
| 10 |    | −135.5349   | 11.50000  |         | 67.14  |
| 11 | a  | −58.4417    | 8.50000   | ACRYLIC | 68.89  |
| 12 | ac | −52.0916    | 161.73210 |         | 76.10  |
| 13 |    | ∞           | 5.00000   | ACRYLIC | 260.11 |
| 14 | cf | −130.0000   | 10.00384  |         | 263.34 |

Symbol Description a - Polynomial asphere
c - Conic section
f Fresnel

Conics

| Surface Number | Constant |
|---|---|
| 2  | −3.9547E − 02 |
| 12 | −7.2657E − 01 |
| 14 | −1.0000E + 00 |

Even Polynomial Aspheres

| Surf. No. | D | E | F | G | H | I |
|---|---|---|---|---|---|---|
| 1  | 5.1921E − 07  | −1.4169E − 10 | 2.5070E − 14  | 1.5959E − 18  | −1.2859E − 21 | 1.7603E − 25 |
| 2  | 1.7534E − 07  | −4.2537E − 10 | 1.4729E − 13  | −7.6936E − 17 | −3.8396E − 21 | 1.9069E − 24 |
| 3  | −2.6406E − 08 | −1.7369E − 11 | −2.4625E − 14 | 4.3962E − 18  | 6.4452E − 21  | −7.1142E − 25 |
| 4  | 9.8219E − 07  | −1.6069E − 11 | 4.2475E − 14  | 1.6398E − 16  | −1.0201E − 19 | 3.5725E − 23 |
| 11 | −1.2463E − 06 | −8.6149E − 10 | 9.7452E − 14  | 5.6548E − 17  | −3.5521E − 20 | 9.8697E − 23 |
| 12 | −9.8197E − 07 | −1.5899E − 10 | −2.6721E − 13 | 1.0635E − 16  | 1.0765E − 19  | −7.0502E − 24 |

First Order Data

| | | | |
|---|---|---|---|
| f/number       | 6.00     | Overall Length         | 945.017 |
| Magnification  | −0.2000  | Forward Vertex Distance | 356.835 |
| Object Height  | −660.40  | Barrel Length          | 346.831 |
| Object Distance| −588.181 | Entrance Pupil Distance | 63.9042 |

TABLE 2-continued

| | | | |
|---|---|---|---|
| Effective Focal Length | 129.296 | Exit Pupil Distance | −2999.17 |
| Image Distance | 10.0038 | Stop Diameter | 36.427 |
| Stop Surface Number | 5 | Distance to Stop | 0.00 |

First Order Properties of Elements

| Element Number | Surface Numbers | | Power | f' |
|---|---|---|---|---|
| 1 | 1 | 2 | −0.55306E − 02 | −180.81 |
| 2 | 3 | 4 | −0.24664E − 02 | −405.45 |
| 3 | 6 | 7 | 0.12899E − 01 | 77.527 |
| 4 | 8 | 9 | −0.15754E − 01 | −63.477 |
| 5 | 9 | 10 | 0.10451E − 01 | 95.681 |
| 6 | 11 | 12 | 0.14857E − 02 | 673.09 |
| 7 | 13 | 14 | 0.37983E − 02 | 263.28 |

First-Order Properties of Doublets

| Element Number | | Surface Numbers | | Power | f' |
|---|---|---|---|---|---|
| 4 | 5 | 8 | 10 | −0.44700E − 02 | −223.72 |

First Order Properties of the Lens

Power    f'
0.77342E − 02    129.30
First Order Data, Surf 1 To 4

K
−.842606E − 02
First Order Data, Surf 6 To 12

K
0.949387E − 02
First Order Data, Surf 1 To 12

K
0.819266E − 02

TABLE 3

| Surf. No. | Type | Radius | Thickness | Glass | Clear Aperature Diameter |
|---|---|---|---|---|---|
| 1 | a | 160.5875 | 7.50000 | ACRYLIC | 124.33 |
| 2 | ac | 56.2822 | 34.44677 | | 100.34 |
| 3 | a | −226.7605 | 6.00000 | NAS | 84.35 |
| 4 | a | −83512.0200 | 48.83702 | | 74.30 |
| 5 | | Aperture stop | 3.08303 | | 40.62 |
| 6 | | 108.6483 | 12.00000 | S-LAH60 | 42.57 |
| 7 | | −155.9742 | 20.41136 | | 45.54 |
| 8 | | −231.8046 | 3.20000 | S-TIH6 | 55.73 |
| 9 | | 69.6695 | 20.00000 | S-FSL5 | 60.28 |
| 10 | | −186.6792 | 11.50000 | | 67.94 |
| 11 | a | −68.8958 | 8.50000 | ACRYLIC | 70.13 |
| 12 | ac | −53.5439 | 166.85750 | | 75.98 |
| 13 | | ∞ | 5.00000 | ACRYLIC | 260.47 |
| 14 | cf | −130.0000 | 10.00062 | | 263.63 |

Symbol Description a - Polynomial asphere
c - Conic section
f Fresnel
Conics

| Surface Number | Constant |
|---|---|
| 2 | −3.9547E − 02 |
| 12 | −7.2657E − 01 |
| 14 | −1.0000E + 00 |

Even Polynomial Aspheres

| Surf. No. | D | E | F | G | H | I |
|---|---|---|---|---|---|---|
| 1 | 5.0215E − 07 | −1.3626E − 10 | 2.4969E − 14 | 1.4778E − 18 | −1.3152E − 21 | 1.7208E − 25 |
| 2 | 1.4344E − 07 | −4.1991E − 10 | 1.4743E − 13 | −7.6239E − 17 | −3.7373E − 21 | 1.9241E −24 |

TABLE 3-continued

| | | | | | | |
|---|---|---|---|---|---|---|
| 3 | −1.9343E − 08 | −9.5155E − 12 | −2.2939E − 14 | 4.7688E − 18 | 6.3601E − 21 | −1.1006E − 24 |
| 4 | 1.0102E − 06 | 1.6231E − 11 | 4.6262E − 14 | 1.5936E − 16 | −1.0202E − 19 | 3.6344E − 23 |
| 11 | −1.2542E − 06 | −8.4103E − 10 | 1.0797E − 13 | 5.3568E − 17 | −3.8487E − 20 | 9.3420E − 23 |
| 12 | −9.1304E − 07 | −1.7016E − 10 | −2.8880E − 13 | 9.6122E − 17 | 1.0830E − 19 | 3.4091E − 24 |

First Order Data

| | | | |
|---|---|---|---|
| f/number | 6.00 | Overall Length | 945.005 |
| Magnification | −0.2000 | Forward Vertex Distance | 357.336 |
| Object Height | −660.40 | Barrel Length | 347.336 |
| Object Distance | −587.669 | Entrance Pupil Distance | 62.4098 |
| Effective Focal Length | 129.233 | Exit Pupil Distance | −4284.82 |
| Image Distance | 10.0006 | Stop Diameter | 35.730 |
| Stop Surface Number | 5 | Distance to Stop | 0.00 |

First Order Properties of Elements

| Element Number | Surface Numbers | | Power | f' |
|---|---|---|---|---|
| 1 | 1 | 2 | −0.55306E − 02 | −179.76 |
| 2 | 3 | 4 | −0.25038E − 02 | −399.39 |
| 3 | 6 | 7 | 0.12835E − 01 | 77.912 |
| 4 | 8 | 9 | −0.15242E − 01 | −65.608 |
| 5 | 9 | 10 | 0.93941E − 02 | 106.45 |
| 6 | 11 | 12 | 0.24310E − 02 | 411.36 |
| 7 | 13 | 14 | 0.37983E − 02 | 263.28 |

First-Order Properties of Doublets

| Element Number | Surface Numbers | | Power | f' |
|---|---|---|---|---|
| 4 | 5 | 8 | 10 | −0.52534E − 02 | −190.35 |

First Order Properties of the Lens

Power    f'
0.77379E − 02    129.23
First Order Data, Surf 1 To 4

K
−.850778E − 02
First Order Data, Surf 6 To 12

K
0.949226E − 02
First Order Data, Surf 1 To 12

K
0.819180E − 02

TABLE 4

| Surf. No. | Type | Radius | Thickness | Glass | Clear Aperature Diameter |
|---|---|---|---|---|---|
| 1 | a | 185.1534 | 7.00000 | ACRYLIC | 128.15 |
| 2 | ac | 55.9573 | 37.12445 | | 101.36 |
| 3 | a | −311.4152 | 6.00000 | STYRENE | 83.81 |
| 4 | a | 616.7119 | 48.27261 | | 74.48 |
| 5 | | Aperture stop | 1.00000 | | 41.10 |
| 6 | | 88.7846 | 13.37400 | S-BAH28 | 40.85 |
| 7 | | −166.1071 | 25.22543 | | 44.31 |
| 8 | | −237.5918 | 3.71500 | S-TIH6 | 56.48 |
| 9 | | 70.5708 | 22.29000 | S-FSL5 | 61.49 |
| 10 | | −82.3089 | 10.40200 | | 67.77 |
| 11 | a | −51.6791 | 8.91600 | ACRYLIC | 68.70 |
| 12 | ac | −55.5693 | 166.13140 | | 78.64 |
| 13 | | ∞ | 4.45800 | ACRYLIC | 260.44 |
| 14 | cf | −148.6000 | 9.92784 | | 263.27 |

Symbol Description a - Polynomial asphere
c - Conic section
f - Fresnel

TABLE 4-continued

Conics

| Surface Number | Constant |
|---|---|
| 2 | −3.9547E − 02 |
| 12 | −7.2657E − 01 |
| 14 | −1.0000E + 00 |

Even Polynomial Aspheres

| Surf. No. | D | E | F | G | H | I |
|---|---|---|---|---|---|---|
| 1 | 5.5542E − 07 | −1.4135E − 10 | 2.4172E − 14 | 1.2234E − 18 | −1.3500E − 21 | 1.7631E − 25 |
| 2 | 1.8005E − 07 | −3.3979E − 10 | 1.4978E − 13 | −7.8169E − 17 | −3.9974E − 21 | 1.6767E − 24 |
| 3 | 5.5992E − 09 | −4.3909E − 13 | −2.8727E − 14 | −1.8376E − 19 | 3.7384E − 21 | −2.2208E − 25 |
| 4 | 9.9934E − 07 | −7.5851E − 11 | 4.9858E − 14 | 1.7606E − 16 | −9.0550E − 20 | 1.5339E − 23 |
| 11 | −1.3055E − 06 | −1.0674E − 09 | 1.0318E − 14 | −3.1229E − 19 | −6.1009E − 20 | 1.0654E − 22 |
| 12 | −1.1167E − 06 | −1.2571E − 10 | −2.9238E − 13 | 9.2900E − 17 | 9.8782E − 20 | −1.1800E − 23 |

First Order Data

| | | | |
|---|---|---|---|
| f/number | 6.00 | Overall Length | 949.812 |
| Magnification | −0.2000 | Forward Vertex Distance | 363.837 |
| Object Height | −660.40 | Barrel Length | 353.909 |
| Object Distance | −585.975 | Entrance Pupil Distance | 61.0286 |
| Effective Focal Length | 127.262 | Exit Pupil Distance | −1528.94 |
| Image Distance | 9.92784 | Stop Diameter | 37.370 |
| Stop Surface Number | 5 | Distance to Stop | 0.00 |

First Order Properties of Elements

| Element Number | Surface Numbers | | Power | f' |
|---|---|---|---|---|
| 1 | 1 | 2 | −0.60470E − 02 | −165.37 |
| 2 | 3 | 4 | −0.28821E − 02 | −346.97 |
| 3 | 6 | 7 | 0.12303E − 01 | 81.281 |
| 4 | 8 | 9 | −0.15016E − 01 | −66.595 |
| 5 | 9 | 10 | 0.12258E − 01 | 81.583 |
| 6 | 11 | 12 | −0.16214E − 03 | −6167.5 |
| 7 | 13 | 14 | 0.33229E − 02 | 300.95 |

First-Order Properties of Doublets

| Element Number | | Surface Numbers | | Power | f' |
|---|---|---|---|---|---|
| 4 | 5 | 8 | 10 | −0.13370E − 02 | −747.95 |

First Order Properties of the Lens

Power    f'
0.78578E − 02    127.26
First Order Data, Surf 1 To 4

K
−.956210E − 02
First Order Data, Surf 6 To 12

K
0.971637E − 02
First Order Data, Surf 1 To 12

K
0.823636E − 02

TABLE 5

| Surf. No. | Type | Radius | Thickness | Glass | Clear Aperature Diameter |
|---|---|---|---|---|---|
| 1 | a | 121.3135 | 5.50000 | ACRYLIC | 93.98 |
| 2 | ac | 37.3704 | 26.87716 | | 72.38 |
| 3 | a | −104.8318 | 4.50000 | STYRENE | 69.64 |
| 4 | a | −566.5882 | 22.16920 | | 60.16 |
| 5 | | 82.6919 | 8.00000 | S-LAL8 | 45.12 |
| 6 | | −172.1754 | 8.27182 | | 42.98 |
| 7 | | Aperture stop | 25.30855 | | 36.76 |
| 8 | a | −53.8297 | 6.00000 | ACRYLIC | 45.16 |

TABLE 5-continued

| | | | | | |
|---|---|---|---|---|---|
| 9 | ac | −31.3113 | 1.11000 | | 46.83 |
| 10 | | −6014.2790 | 12.00000 | S-FSL5 | 55.18 |
| 11 | | −48.2090 | 2.50000 | S-TIH6 | 56.72 |
| 12 | | −200.0814 | 115.78167 | | 63.08 |

Symbol Description a - Polynomial asphere
c - Conic section
Conics

| Surface Number | Constant |
|---|---|
| 2 | −3.9547E − 02 |
| 9 | −7.2657E − 01 |

Even Polynomial Aspheres

| Surf. No. | D | E | F | G | H | I |
|---|---|---|---|---|---|---|
| 1 | 1.6914E − 06 | −8.1946E − 10 | 3.6405E − 13 | 2.7667E − 17 | −1.0762E − 19 | 3.5704E − 23 |
| 2 | 2.5396E − 07 | −1.3857E − 09 | 2.0227E − 12 | −2.6768E − 15 | −2.5275E − 19 | 2.4112E − 22 |
| 3 | −5.6233E − 08 | −3.6837E − 10 | −3.5247E − 13 | 3.4946E − 16 | 7.9557E − 19 | −4.1882E − 22 |
| 4 | 2.1606E − 06 | −5.8182E − 10 | −6.1924E − 13 | 5.9161E − 15 | −7.0468E − 18 | 3.9078E − 21 |
| 8 | −3.5183E − 06 | −5.1720E − 09 | 4.2001E − 12 | 1.8739E − 14 | 2.6471E − 17 | 7.4945E − 21 |
| 9 | −2.6671E − 06 | −1.3137E − 09 | −2.6658E − 12 | −1.7201E − 15 | 4.6175E − 17 | 2.1987E − 20 |

First Order Data

| | | | |
|---|---|---|---|
| f/number | 4.75 | Overall Length | 944.598 |
| Magnification | −0.1184 | Forward Vertex Distance | 238.018 |
| Object Height | −780.79 | Barrel Length | 122.237 |
| Object Distance | −706.580 | Entrance Pupil Distance | 43.9499 |
| Effective Focal Length | 83.4101 | Exit Pupil Distance | −45.3772 |
| Image Distance | 115.782 | Stop Diameter | 29.688 |
| Stop Surface Number | 7 | Distance to Stop | 0.00 |
| Object space f/number | −40.13 | | |

First Order Properties of Elements

| Element Number | Surface Numbers | | Power | f' |
|---|---|---|---|---|
| 1 | 1 | 2 | −0.89448E − 02 | −111.80 |
| 2 | 3 | 4 | −0.46084E − 02 | −217.00 |
| 3 | 5 | 6 | 0.12652E − 01 | 79.039 |
| 4 | 8 | 9 | 0.71780E − 02 | 139.31 |
| 5 | 10 | 11 | 0.10072E − 01 | 99.288 |
| 6 | 11 | 12 | −0.12701E − 01 | −78.737 |

First-Order Properties of Doublets

| Element Number | Surface Numbers | | Power | f' |
|---|---|---|---|---|
| 5 | 6 | 10 | 12 | −0.26936E − 02 | −371.25 |

First Order Properties of the Lens

| Power | f' |
|---|---|
| 0.11989E − 01 | 83.410 |

First Order Data, Surf 1 To 4

K
−.145655E − 01

First Order Data, Surf 5 To 12

K
0.146216E − 01

First Order Data, Surf 8 To 12

K
0.451746E − 02

TABLE 6

| Surf. No. | Type | Radius | Thickness | Glass | Clear Aperature Diameter |
|---|---|---|---|---|---|
| 1 | a | 101.1640 | 5.50000 | ACRYLIC | 93.84 |
| 2 | ac | 37.5879 | 26.32587 | | 73.32 |

TABLE 6-continued

| | | | | | |
|---|---|---|---|---|---|
| 3 | a | −230.5180 | 4.50000 | NAS | 66.52 |
| 4 | a | 327.2455 | 32.69226 | | 56.53 |
| 5 | | Aperture stop | 2.00000 | | 38.71 |
| 6 | | 70.6667 | 9.00000 | S-LAM66 | 45.31 |
| 7 | | −115.0674 | 13.77648 | | 46.19 |
| 8 | | −116.6265 | 2.50000 | S-TIH6 | 49.01 |
| 9 | | 48.5101 | 15.00000 | S-FSL5 | 53.01 |
| 10 | | −68.3708 | 7.00000 | | 54.19 |
| 11 | a | −41.8443 | 6.00000 | ACRYLIC | 54.13 |
| 12 | ac | −34.5169 | 118.14960 | | 57.96 |
| 13 | | ∞ | 3.00000 | ACRYLIC | 177.08 |
| 14 | cf | −100.0000 | 5.00229 | | 178.78 |

Symbol Description a - Polynomial asphere
c - Conic section
f - Fresnel

Conics

| Surface Number | Constant |
|---|---|
| 2 | −3.9547E − 02 |
| 12 | −7.2657E − 01 |
| 14 | −1.0000E + 00 |

Even Polynomial Aspheres

| Surf. No. | D | E | F | G | H | I |
|---|---|---|---|---|---|---|
| 1 | 1.7965E − 06 | −1.0343E − 09 | 3.8482E − 13 | 3.9158E − 17 | −1.0648E − 19 | 3.1223E − 23 |
| 2 | 7.7923E − 07 | −2.5956E − 09 | 2.5024E − 12 | −2.6735E − 15 | −2.4077E − 19 | 3.4099E − 22 |
| 3 | 9.4594E − 08 | −1.9518E − 11 | −2.2169E − 13 | 2.0919E − 16 | 5.5647E − 19 | −2.2750E − 22 |
| 4 | 2.9309E − 06 | −9.5395E − 11 | 4.1607E − 13 | 5.7614E − 15 | −6.4864E − 18 | 3.8284E − 21 |
| 11 | −3.5617E − 06 | −7.2305E − 09 | 1.5497E − 12 | 2.4782E − 15 | −2.3639E − 18 | 1.2345E − 20 |
| 12 | −3.3117E − 06 | −1.3610E − 09 | −5.8027E − 12 | 2.3740E − 15 | 7.7167E − 18 | 6.3706E − 22 |

First Order Data

| | | | |
|---|---|---|---|
| f/number | 4.00 | Overall Length | 690.920 |
| Magnification | −0.1757 | Forward Vertex Distance | 250.447 |
| Object Height | −508.00 | Barrel Length | 245.444 |
| Object Distance | −440.474 | Entrance Pupil Distance | 44.3324 |
| Effective Focal Length | 84.3371 | Exit Pupil Distance | −1508.22 |
| Image Distance | 5.00229 | Stop Diameter | 36.258 |
| Stop Surface Number | 5 | Distance to Stop | 0.00 |

First Order Properties of Elements

| Element Number | Surface Numbers | | Power | f' |
|---|---|---|---|---|
| 1 | 1 | 2 | −0.80195E − 02 | −124.70 |
| 2 | 3 | 4 | −0.42218E − 02 | −236.86 |
| 3 | 6 | 7 | 0.18021E − 01 | 55.490 |
| 4 | 8 | 9 | −0.23881E − 01 | −41.875 |
| 5 | 9 | 10 | 0.16511E − 01 | 60.566 |
| 6 | 11 | 12 | 0.31831E − 02 | 314.16 |
| 7 | 13 | 14 | 0.49378E − 02 | 202.52 |

First-Order Properties of Doublets

| Element Number | | Surface Numbers | | Power | f' |
|---|---|---|---|---|---|
| 4 | 5 | 8 | 10 | −0.54900E − 02 | −182.15 |

First Order Properties of the Lens

Power     f'
0.11857E − 01     84.337

First Order Data, Surf 1 To 4

K
−.130968E − 01

First Order Data, Surf 6 To 12

K
0.137325E − 01

TABLE 6-continued

First Order Data, Surf 1 To 12

K
0.124078E − 01

TABLE 7

| Surf. No. | Type | Radius | Thickness | Glass | Clear Aperature Diameter |
|---|---|---|---|---|---|
| 1 | a | 108.7661 | 5.50000 | ACRYLIC | 95.18 |
| 2 | ac | 37.2931 | 26.02508 |  | 73.43 |
| 3 | a | −140.0141 | 4.50000 | STYRENE | 69.76 |
| 4 | a | 6965.5840 | 40.11823 |  | 59.16 |
| 5 |  | Aperture stop | −4.78181 |  | 37.15 |
| 6 |  | 64.6155 | 8.00000 | LAM7 | 37.89 |
| 7 |  | −135.0031 | 18.00242 |  | 35.99 |
| 8 |  | −224.2957 | 2.50000 | S-TIH6 | 39.53 |
| 9 |  | 44.2473 | 15.00000 | S-FSL5 | 42.99 |
| 10 |  | −59.2993 | 6.00000 |  | 46.87 |
| 11 | a | −33.7804 | 6.00000 | ACRYLIC | 46.92 |
| 12 | ac | −34.8787 | 114.92140 |  | 52.89 |
| 13 |  | ∞ | 3.00000 | ACRYLIC | 177.41 |
| 14 | cf | −100.0000 | 5.05582 |  | 179.31 |

Symbol Description a - Polynomial asphere
c - Conic section
f - Fresnel

Conics

| Surface Number | Constant |
|---|---|
| 2 | −3.9547E − 02 |
| 12 | −7.2657E − 01 |
| 14 | −1.0000E + 00 |

Even Polynomial Aspheres

| Surf. No. | D | E | F | G | H | I |
|---|---|---|---|---|---|---|
| 1 | 1.2764E − 06 | −7.7021E − 10 | 3.8376E − 13 | 1.6319E − 17 | −1.0731E − 19 | 3.7101E − 23 |
| 2 | −1.2308E − 07 | −1.7255E − 09 | 1.9020E − 12 | −2.6868E − 15 | −1.7251E − 19 | 3.6916E − 22 |
| 3 | 2.2620E − 07 | −2.3695E − 10 | −3.6687E − 13 | 3.0616E − 16 | 7.3661E − 19 | −3.6454E − 22 |
| 4 | 2.6449E − 06 | −1.6486E − 10 | 3.1694E − 14 | 5.7633E − 15 | −6.8953E − 18 | 3.9386E − 21 |
| 11 | −3.0996E − 06 | −4.5377E − 09 | 2.5145E − 12 | 1.9829E − 15 | −3.7589E − 18 | 1.1609E − 20 |
| 12 | −3.2036E − 06 | −2.6466E − 10 | −3.6602E − 12 | 3.2396E − 15 | 6.1979E − 18 | −2.5395E − 21 |

First Order Data

| | | | |
|---|---|---|---|
| f/number | 4.62 | Overall Length | 956.421 |
| Magnification | −0.1152 | Forward Vertex Distance | 249.841 |
| Object Height | −780.79 | Barrel Length | 244.785 |
| Object Distance | −706.580 | Entrance Pupil Distance | 45.6354 |
| Effective Focal Length | 85.7199 | Exit Pupil Distance | −928.014 |
| Image Distance | 5.05582 | Stop Diameter | 34.403 |
| Stop Surface Number | 5 | Distance to Stop | 0.00 |
| Object Space f/number | −40.13 | | |

First Order Properties of Elements

| Element Number | Surface Numbers | | Power | f' |
|---|---|---|---|---|
| 1 | 1 | 2 | −0.84793E − 02 | −117.93 |
| 2 | 3 | 4 | −0.43356E − 02 | −230.65 |
| 3 | 6 | 7 | 0.16969E − 01 | 58.933 |
| 4 | 8 | 9 | −0.22081E − 01 | −45.289 |
| 5 | 9 | 10 | 0.18385E − 01 | 54.392 |
| 6 | 11 | 12 | 0.37089E − 03 | 2696.2 |
| 7 | 13 | 14 | 0.49378E − 02 | 202.52 |

First-Order Properties of Doublets

| Element Number | Surface Numbers | | Power | f' |
|---|---|---|---|---|
| 4 | 5 | 8 | 10 | −0.17690E − 02 | −565.29 |

TABLE 7-continued

First Order Properties of the Lens

Power    f'
0.11666E − 01    85.720
First Order Data, Surf 1 To 4

K
−.137013E − 01
First Order Data, Surf 6 To 12

K
0.137304E − 01
First Order Data, Surf 8 To 12

K
−.125074E − 02
First Order Data, Surf 6 To 14

K
0.778097E − 02

TABLE 8

| Surf. No. | Type | Radius | Thickness | Glass | Clear Aperature Diameter |
|---|---|---|---|---|---|
| 1 | a | 105.2922 | 5.50000 | ACRYLIC | 93.64 |
| 2 | ac | 37.5621 | 26.71513 | | 73.64 |
| 3 | a | −91.1548 | 4.50000 | STYRENE | 73.02 |
| 4 | a | 815.6250 | 25.11702 | | 61.49 |
| 5 | | 71.1566 | 10.00000 | LAM7 | 51.41 |
| 6 | | −141.9667 | 9.19510 | | 49.77 |
| 7 | | Aperture stop | 13.33371 | | 31.95 |
| 8 | | 5825.6780 | 12.00000 | S-NSL3 | 38.66 |
| 9 | | −35.4927 | 2.50000 | S-TIH6 | 41.47 |
| 10 | | −343.9931 | 4.99551 | | 47.03 |
| 11 | a | −57.7633 | 8.00000 | ACRYLIC | 47.01 |
| 12 | ac | −31.8511 | 120.05770 | | 50.07 |
| 13 | | ∞ | 3.00000 | ACRYLIC | 174.38 |
| 14 | cf | −100.0000 | 5.00407 | | 176.18 |

Symbol Description a - Polynomial asphere
c - Conic section
f - Fresnel

Conics

| Surface Number | Constant |
|---|---|
| 2 | −3.9547E − 02 |
| 12 | −7.2657E − 01 |
| 14 | −1.0000E + 00 |

Even Polynomial Aspheres

| Surf. No. | D | E | F | G | H | I |
|---|---|---|---|---|---|---|
| 1 | 1.3663E − 06 | −7.2971E − 10 | 3.4739E − 13 | 6.4405E − 18 | −1.0543E − 19 | 3.8994E − 23 |
| 2 | 6.2351E − 08 | −1.7631E − 09 | 2.0457E − 12 | −2.7025E − 15 | −2.5440E − 19 | 3.0154E − 22 |
| 3 | −1.7792E − 08 | −2.8884E − 10 | −3.9648E − 13 | 3.0951E − 16 | 7.2473E − 19 | −3.6214E − 22 |
| 4 | 2.0068E − 06 | −2.8238E − 10 | −4.4828E − 13 | 5.6264E − 15 | −7.0143E − 18 | 3.8836E − 21 |
| 11 | −3.9433E − 06 | −4.3889E − 09 | 4.3142E − 12 | 6.7264E − 15 | 9.2526E − 18 | 7.5354E − 21 |
| 12 | −2.8029E − 06 | −9.1027E − 10 | −4.3400E − 12 | 3.2915E − 15 | 1.1406E − 17 | 1.2606E − 20 |

First Order Data

| | | | |
|---|---|---|---|
| f/number | 4.56 | Overall Length | 956.498 |
| Magnification | −0.1137 | Forward Vertex Distance | 249.918 |
| Object Height | −780.79 | Barrel Length | 244.914 |
| Object Distance | −706.580 | Entrance Pupil Distance | 45.7692 |
| Effective Focal Length | 84.6354 | Exit Pupil Distance | −927.962 |
| Image Distance | 5.00407 | Stop Diameter | 30.362 |
| Stop Surface Number | 7 | Distance to Stop | 0.00 |
| Object Space f/number | −40.13 | | |

TABLE 8-continued

First Order Properties of Elements

| Element Number | Surface Numbers | | Power | f' |
|---|---|---|---|---|
| 1 | 1 | 2 | −0.82290E − 02 | −121.52 |
| 2 | 3 | 4 | −0.72697E − 02 | −137.56 |
| 3 | 5 | 6 | 0.15597E − 01 | 64.114 |
| 4 | 8 | 9 | 0.14739E − 01 | 67.847 |
| 5 | 9 | 10 | −0.20459E − 01 | −48.879 |
| 6 | 11 | 12 | 0.76641E − 02 | 130.48 |
| 7 | 13 | 14 | 0.49378E − 02 | 202.52 |

First-Order Properties of Doublets

| Element Number | | Surface Numbers | | Power | f' |
|---|---|---|---|---|---|
| 4 | 5 | 8 | 10 | −0.57534E − 02 | −173.81 |

First Order Properties of the Lens

Power      f'
0.11815E − 01    84.635
First Order Data, Surf 1 To 4

K
−.169883E − 01
First Order Data, Surf 5 To 12

K
0.147556E − 01
First Order Data, Surf 8 To 12

K
0.268929E − 02
First Order Data, Surf 5 To 14

K
0.750411E − 02

TABLE 9

| Surf. No. | Type | Radius | Thickness | Glass | Clear Aperature Diameter |
|---|---|---|---|---|---|
| 1 | a | 195.3287 | 6.00000 | ACRYLIC | 110.49 |
| 2 | ac | 66.1364 | 24.84996 | | 92.71 |
| 3 | a | −214.3693 | 6.00000 | STYRENE | 83.90 |
| 4 | a | −496.9632 | 54.15163 | | 75.13 |
| 5 | | Aperture stop | 1.00000 | | 34.83 |
| 6 | | 108.4953 | 7.00000 | S-LAM3 | 36.97 |
| 7 | | −129.5536 | 28.89147 | | 38.66 |
| 8 | | −514.9892 | 3.00000 | S-TIH6 | 56.58 |
| 9 | | 95.0696 | 10.00000 | S-FSL5 | 59.83 |
| 10 | | −393.3115 | 21.80206 | | 62.36 |
| 11 | a | −67.1037 | 6.00000 | ACRYLIC | 71.13 |
| 12 | ac | −76.9841 | 165.26320 | | 80.86 |
| 13 | | ∞ | 6.20000 | ACRYLIC | 320.18 |
| 14 | cf | −130.0000 | 15.00088 | | 325.20 |

Symbol Description a - Polynomial asphere
c - Conic section
f - Fresnel
Conics

| Surface Number | Constant |
|---|---|
| 2 | −3.9547E − 02 |
| 12 | −7.2657E − 01 |
| 14 | −1.0000E + 00 |

Even Polynomial Aspheres

| Surf. No. | D | E | F | G | H | I |
|---|---|---|---|---|---|---|
| 1 | 2.2482E − 07 | −2.1613E − 11 | 1.0591E − 14 | 1.5679E − 18 | 2.0005E − 22 | −7.8114E − 26 |
| 2 | 9.9987E − 08 | −2.4123E − 10 | 3.6729E − 14 | −1.3731E − 17 | −6.1726E − 21 | 2.0133E − 24 |

TABLE 9-continued

| | | | | | | |
|---|---|---|---|---|---|---|
| 3 | −1.5056E − 07 | −1.1192E − 11 | 2.4849E − 14 | 2.1932E − 17 | 5.1684E − 21 | −4.1736E − 24 |
| 4 | 9.0123E − 07 | 1.1630E − 10 | 6.6039E − 14 | 8.1894E − 17 | −1.6775E − 20 | 1.3048E − 23 |
| 11 | −1.3235E − 06 | −4.3404E − 10 | −5.7712E − 14 | −4.4624E − 17 | −1.2254E − 20 | 1.1853E − 23 |
| 12 | −5.7464E − 07 | −1.4213E − 11 | −2.8368E − 15 | 4.8037E − 17 | −1.2352E − 20 | −4.1708E − 24 |

First Order Data

| | | | |
|---|---|---|---|
| f/number | 8.00 | Overall Length | 996.711 |
| Magnification | −0.2480 | Forward Vertex Distance | 355.159 |
| Object Height | −660.40 | Barrel Length | 340.158 |
| Object Distance | −641.551 | Entrance Pupil Distance | 61.3495 |
| Effective Focal Length | 170.928 | Exit Pupil Distance | −2164.88 |
| Image Distance | 15.0009 | Stop Diameter | 33.073 |
| Stop Surface Number | 5 | Distance to Stop | 0.00 |

First Order Properties of Elements

| Element Number | Surface Numbers | | Power | f' |
|---|---|---|---|---|
| 1 | 1 | 2 | −0.48623E − 02 | −205.66 |
| 2 | 3 | 4 | −0.15657E − 02 | −638.70 |
| 3 | 6 | 7 | 0.12053E − 01 | 82.967 |
| 4 | 8 | 9 | −0.10148E − 01 | −98.541 |
| 5 | 9 | 10 | 0.63458E − 02 | 157.58 |
| 6 | 11 | 12 | −0.75483E − 03 | −1324.8 |
| 7 | 13 | 14 | 0.37983E − 02 | 263.28 |

First-Order Properties of Doublets

| Element Number | Surface Numbers | | Power | f' |
|---|---|---|---|---|
| 4 | 5 | 8 | 10 | −0.37009E − 02 | −270.20 |

First Order Properties of the Lens

Power       f'
0.58504E − 02    170.93
First Order Data, Surf 1 To 4

K
−.657936E − 02
First Order Data, Surf 6 To 12

K
0.918044E − 02
First Order Data, Surf 1 To 12

K
0.647583E − 02

TABLE 10

| Surf. No. | Type | Radius | Thickness | Glass | Clear Aperature Diameter |
|---|---|---|---|---|---|
| 1 | a | 258.2072 | 6.00000 | ACRYLIC | 110.79 |
| 2 | ac | 59.3331 | 22.32865 | | 89.64 |
| 3 | a | −283.4921 | 6.00000 | STYRENE | 84.97 |
| 4 | a | −274.7015 | 56.12022 | | 76.73 |
| 5 | | Aperture stop | 1.00000 | | 34.20 |
| 6 | | 104.7050 | 7.00000 | S-BAH27 | 35.06 |
| 7 | | −122.1513 | 19.41940 | | 36.58 |
| 8 | | −658.7906 | 3.96800 | S-TIH6 | 48.33 |
| 9 | | 80.1333 | 12.00000 | S-FSL5 | 51.58 |
| 10 | | −293.1384 | 30.12323 | | 55.71 |
| 11 | a | −64.0961 | 6.00000 | ACRYLIC | 71.14 |
| 12 | ac | −83.1455 | 164.01620 | | 82.15 |
| 13 | | ∞ | 6.20000 | ACRYLIC | 320.21 |
| 14 | cf | −135.0000 | 14.98035 | | 325.26 |

Symbol Description a - Polynomial asphere
c - Conic section
f - Fresnel

TABLE 10-continued

Conics

| Surface Number | Constant |
|---|---|
| 2 | −3.9547E − 02 |
| 12 | −7.2657E − 01 |
| 14 | −1.0000E + 00 |

Even Polynomial Aspheres

| Surf. No. | D | E | F | G | H | I |
|---|---|---|---|---|---|---|
| 1 | 2.3619E − 07 | −9.8974E − 12 | 1.2031E − 14 | 1.4595E − 18 | 1.8561E − 22 | −4.0125E − 26 |
| 2 | −1.5725E − 07 | −2.6487E − 10 | 1.5765E − 14 | −2.0110E − 17 | −8.0390E − 21 | 1.1174E − 24 |
| 3 | −1.8009E − 07 | 3.5484E − 12 | 2.5341E − 14 | 2.6061E − 17 | 6.2369E − 21 | −5.5936E − 24 |
| 4 | 8.3573E − 07 | 1.6782E − 10 | 9.3073E − 14 | 8.2129E − 17 | −2.0601E − 20 | 2.0068E − 23 |
| 11 | −1.2181E − 06 | −5.7741E − 10 | −6.6345E − 14 | −1.9375E − 17 | −1.1559E − 20 | −8.4347E − 24 |
| 12 | −5.5249E − 07 | −4.6154E − 11 | −2.7740E − 14 | 3.9365E − 17 | 1.3688E − 20 | −5.0708E − 24 |

First Order Data

| | | | |
|---|---|---|---|
| f/number | 8.00 | Overall Length | 996.983 |
| Magnification | −0.2480 | Forward Vertex Distance | 355.156 |
| Object Height | −660.40 | Barrel Length | 340.176 |
| Object Distance | −641.827 | Entrance Pupil Distance | 58.4858 |
| Effective Focal Length | 169.073 | Exit Pupil Distance | −1567.38 |
| Image Distance | 14.9804 | Stop Diameter | 33.416 |
| Stop Surface Number | 5 | Distance to Stop | 0.00 |

First Order Properties of Elements

| Element Number | Surface Numbers | | Power | f' |
|---|---|---|---|---|
| 1 | 1 | 2 | −0.63459E − 02 | −157.58 |
| 2 | 3 | 4 | 0.84256E − 04 | 11869. |
| 3 | 6 | 7 | 0.12355E − 01 | 80.939 |
| 4 | 8 | 9 | −0.11402E − 01 | −87.704 |
| 5 | 9 | 10 | 0.76907E − 02 | 130.03 |
| 6 | 11 | 12 | −0.15812E − 02 | −632.42 |
| 7 | 13 | 14 | 0.36576E − 02 | 273.40 |

First-Order Properties of Doublets

| Element Number | | Surface Numbers | | Power | f' |
|---|---|---|---|---|---|
| 4 | 5 | 8 | 10 | −0.35371E − 02 | −282.72 |

First Order Properties of the Lens

| Power | f' |
|---|---|
| 0.59146E − 02 | 169.07 |

First Order Data, Surf 1 To 4

K
−.619861E − 02
First Order Data, Surf 6 To 12

K
0.888162E − 02
First Order Data, Surf 1 To 12

| ZP | K | PP1 | PP2 |
|---|---|---|---|
| N | 0.651176E − 02 | 98.5219 | −10.4745 |

TABLE 11

| Surf. No. | Type | Radius | Thickness | Glass | Clear Aperature Diameter |
|---|---|---|---|---|---|
| 1 | a | 161.7230 | 6.50000 | ACRYLIC | 126.71 |
| 2 | ac | 69.4456 | 29.54708 | | 107.32 |
| 3 | a | −222.9943 | 6.50000 | STYRENE | 100.79 |
| 4 | a | −658.8382 | 26.04984 | | 88.34 |
| 5 | | ∞ | 30.00000 | | 73.82 |
| 6 | | Aperture stop | 1.22147 | | 54.58 |
| 7 | | 144.0267 | 10.00000 | S-LAM3 | 57.04 |
| 8 | | −124.6048 | 29.68391 | | 58.80 |

TABLE 11-continued

| | | | | | |
|---|---|---|---|---|---|
| 9 | | −198.3449 | 4.00000 | S-TIH6 | 73.20 |
| 10 | | 159.6097 | 14.00000 | N-BK7 | 78.56 |
| 11 | | −193.4253 | 41.53725 | | 81.62 |
| 12 | a | −108.6317 | 7.00000 | ACRYLIC | 98.36 |
| 13 | ac | −121.6245 | 184.51550 | | 111.95 |
| 14 | | ∞ | 2.00000 | ACRYLIC | 379.95 |
| 15 | acf | −125.0000 | 15.00000 | | 381.52 |
| 16 | | ∞ | 1.80000 | N-BK7 | 385.00 |
| 17 | | ∞ | 0.01327 | | 385.00 |

Symbol Description a - Polynomial asphere
c - Conic section
f - Fresnel

Conics

| Surface Number | Constant |
|---|---|
| 2 | −3.9547E − 02 |
| 12 | −7.2657E − 01 |
| 14 | −1.0000E + 00 |

Even Polynomial Aspheres

| Surf. No. | D | E | F | G | H | I |
|---|---|---|---|---|---|---|
| 1 | 1.5264E − 07 | −2.3729E − 12 | 4.7708E − 15 | 4.8536E − 19 | −2.7977E − 23 | 1.4041E − 26 |
| 2 | −7.7682E − 09 | −1.1227E − 10 | 7.6390E − 15 | −3.5466E − 18 | −1.3050E − 21 | −1.3674E − 26 |
| 3 | −3.6287E − 09 | 1.5885E − 11 | 1.1955E − 14 | 2.4914E − 18 | −4.5688E − 22 | −2.0648E − 25 |
| 4 | 6.9520E − 07 | 1.4225E − 10 | 2.6589E − 14 | 2.0029E − 17 | −2.6371E − 21 | 3.4632E − 24 |
| 12 | −1.5322E − 06 | −2.3377E − 10 | −1.1764E − 14 | 2.2657E − 18 | 4.5863E − 21 | −1.4587E − 24 |
| 13 | −1.0456E − 06 | −6.3778E − 11 | 5.7635E − 15 | 1.2749E − 17 | 1.4430E − 21 | −5.4740E − 25 |
| 15 | 8.6128E − 09 | −1.1176E − 12 | 5.1420E − 17 | −7.0786E − 22 | 0.0000E + 00 | 0.0000E + 00 |

First Order Data

| | | | |
|---|---|---|---|
| f/number | 6.00 | Overall Length | 1175.02 |
| Magnification | −0.2400 | Forward Vertex Distance | 409.368 |
| Object Height | −792.50 | Barrel Length | 409.355 |
| Object Distance | −765.653 | Entrance Pupil Distance | 68.6738 |
| Effective Focal Length | 203.867 | Exit Pupil Distance | 2699.16 |
| Image Distance | 0.132687E − 01 | Stop Diameter | 50.073 |
| Stop Surface Number | 6 | Distance to Stop | 0.00 |

First Order Properties of Elements

| Element Number | Surface Numbers | | Power | f' |
|---|---|---|---|---|
| 1 | 1 | 2 | −0.39626E − 02 | −252.36 |
| 2 | 3 | 4 | −0.17552E − 02 | −569.75 |
| 3 | 7 | 8 | 0.10618E − 01 | 94.183 |
| 4 | 9 | 10 | −0.92345E − 02 | −108.29 |
| 5 | 10 | 11 | 0.58514E − 02 | 170.90 |
| 6 | 12 | 13 | −0.39910E − 03 | −2505.7 |
| 7 | 14 | 15 | 0.39502E − 02 | 253.15 |

First-Order Properties of Doublets

| Element Number | | Surface Numbers | | Power | f' |
|---|---|---|---|---|---|
| 4 | 5 | 9 | 11 | −0.31020E − 02 | −322.38 |

First Order Properties of the Lens

Power       f'
0.49052E − 02    203.87

First Order Data, Surf 1 To 4

K
−.588532E − 02

First Order Data, Surf 6 To 13

K
0.805005E − 02

First Order Data, Surf 9 To 13

K
−.351898E − 02

TABLE 11-continued

First Order Data, Surf 6 To 15

K 0.291911E – 02

TABLE 12

| Surf. No. | Type | Radius | Thickness | Glass | Clear Aperature Diameter |
|---|---|---|---|---|---|
| 1 | a | 183.7637 | 6.50000 | ACRYLIC | 131.35 |
| 2 | ac | 62.2847 | 30.73961 | | 106.95 |
| 3 | a | −231.6253 | 6.50000 | STYRENE | −101.68 |
| 4 | a | −577.6040 | 57.80329 | | 87.52 |
| 5 | | ∞ | 0.00000 | | 49.34 |
| 6 | | Aperture stop | 0.31575 | | 49.34 |
| 7 | | 148.0523 | 9.00000 | S-BAH27 | 50.83 |
| 8 | | −119.6523 | 30.76130 | | 52.10 |
| 9 | | −165.7589 | 4.00000 | STIH6 | 70.08 |
| 10 | | 115.5810 | 17.00000 | S-NSL3 | 77.67 |
| 11 | | −126.9626 | 37.16498 | | 80.75 |
| 12 | a | −96.4014 | 7.00000 | ACRYLIC | 97.62 |
| 13 | ac | −89.5491 | 196.29030 | | 107.10 |
| 14 | | ∞ | 2.00000 | ACRYLIC | 379.72 |
| 15 | acf | −125.0000 | 15.00000 | | 381.21 |
| 16 | | ∞ | 1.80000 | N-BK7 | 379.42 |
| 17 | | ∞ | 0.04128 | | 379.34 |

Symbol Description a - Polynomial asphere
c - Conic section
f - Fresnel

Conics

| Surface Number | Constant |
|---|---|
| 2 | −3.9547E − 02 |
| 12 | −7.2657E − 01 |
| 14 | −1.0000E + 00 |

Even Polynomial Aspheres

| Surf. No. | D | E | F | G | H | I |
|---|---|---|---|---|---|---|
| 1 | 2.6491E − 07 | −5.1379E − 12 | 2.8910E − 15 | 1.4003E − 19 | −4.7468E − 23 | 3.3993E − 26 |
| 2 | 4.8188E − 08 | −1.2494E − 10 | −5.4518E − 15 | −7.4403E − 18 | −2.0186E − 21 | −1.9195E − 25 |
| 3 | 3.5359E − 08 | 3.3287E − 11 | 1.2428E − 14 | −5.5119E − 20 | −9.8146E − 22 | 1.6775E − 26 |
| 4 | 7.6687E − 07 | 2.0360E − 10 | 1.8715E − 14 | 2.0883E − 17 | −3.1454E − 21 | 5.6244E − 24 |
| 12 | −1.5780E − 06 | −2.5812E − 10 | −2.0488E − 15 | 6.9872E − 18 | 5.4533E − 21 | −2.7725E − 24 |
| 13 | −1.2188E − 06 | −1.2723E − 10 | 4.7287E − 15 | 1.3535E − 17 | 1.8001E − 21 | −4.8033E − 25 |
| 15 | 7.5603E − 08 | −5.0818E − 12 | 1.4379E − 16 | −1.4663E − 21 | 0.0000E + 00 | 0.0000E + 00 |

First Order Data

| | | | |
|---|---|---|---|
| f/number | 6.00 | Overall Length | 1100.00 |
| Magnification | −0.2400 | Forward Vertex Distance | 421.917 |
| Object Height | −792.50 | Barrel Length | 421.875 |
| Object Distance | −678.082 | Entrance Pupil Distance | 65.6164 |
| Effective Focal Length | 183.319 | Exit Pupil Distance | 1624.48 |
| Image Distance | 0.412826E − 01 | Stop Diameter | 48.161 |
| Stop Surface Number | 6 | Distance to Stop | 0.00 |

First Order Properties of Elements

| Element Number | Surface Numbers | | Power | f' |
|---|---|---|---|---|
| 1 | 1 | 2 | −0.51480E − 02 | −194.25 |
| 2 | 3 | 4 | −0.15278E − 02 | −654.55 |
| 3 | 7 | 8 | 0.10514E − 01 | 95.110 |
| 4 | 9 | 10 | −0.12009E − 01 | −83.268 |
| 5 | 10 | 11 | 0.83938E − 02 | 119.14 |
| 6 | 12 | 13 | 0.52429E − 03 | 1907.3 |
| 7 | 14 | 15 | 0.39502E − 02 | 253.15 |

TABLE 12-continued

First-Order Properties of Doublets

| Element Number | | Surface Numbers | | Power | f' |
|---|---|---|---|---|---|
| 4 | 5 | 9 | 11 | −0.29745E − 02 | −336.19 |

First Order Properties of the Lens

Power    f'
0.54550E − 02    183.32
First Order Data, Surf 1 To 4

K
−.687809E − 02
First Order Data, Surf 6 To 13

K
0.799005E − 02
First Order Data, Surf 9 To 13

K
−.226601E − 02
First Order Data, Surf 6 To 16

K
0.270349E − 02

TABLE 13

| Surf. No. | Type | Radius | Thickness | Glass | Clear Aperature Diameter |
|---|---|---|---|---|---|
| 1 | a | 176.8559 | 6.50000 | ACRYLIC | 134.10 |
| 2 | ac | 61.9957 | 32.69871 | | 111.93 |
| 3 | a | −232.7231 | 6.50000 | STYRENE | 106.79 |
| 4 | a | −1219.1940 | 65.91736 | | 89.63 |
| 5 | | ∞ | 0.00000 | | 55.01 |
| 6 | | Aperture stop | −4.60426 | | 55.01 |
| 7 | | 155.9761 | 9.00000 | S-BAH27 | 54.15 |
| 8 | | −122.0741 | 34.99076 | | 54.36 |
| 9 | | −142.6875 | 4.00000 | S-TIH6 | 70.48 |
| 10 | | 141.5064 | 17.00000 | S-NSL3 | 78.38 |
| 11 | | −99.2354 | 39.73209 | | 80.81 |
| 12 | a | −90.2215 | 7.00000 | ACRYLIC | 97.39 |
| 13 | ac | −91.3133 | 212.50280 | | 107.89 |
| 14 | | ∞ | 1.80000 | N-BK7 | 378.80 |
| 15 | | ∞ | −0.00446 | | 380.23 |

Symbol Description a - Polynomial asphere
c - Conic section
Conics

| Surface Number | Constant |
|---|---|
| 2 | −3.9547E − 02 |
| 13 | −7.2657E − 01 |

Even Polynomial Aspheres

| Surf. No. | D | E | F | G | H | I |
|---|---|---|---|---|---|---|
| 1 | 3.5292E − 07 | −1.0822E − 11 | 3.1396E − 15 | 2.6125E − 19 | −4.4832E − 23 | 2.6736E − 26 |
| 2 | 1.2381E − 08 | −1.0729E − 10 | −4.3022E − 15 | −7.6653E − 18 | −2.0628E − 21 | −2.1674E − 25 |
| 3 | 3.7175E − 08 | 3.6280E − 11 | 1.0846E − 14 | −1.3064E − 18 | −9.3105E − 22 | 1.0194E − 25 |
| 4 | 8.4733E − 07 | 2.2237E − 10 | 1.4230E − 14 | 2.0669E − 17 | −4.0827E − 21 | 5.9725E − 24 |
| 12 | −1.7267E − 06 | −3.2354E − 10 | −1.0572E − 14 | 7.7361E − 18 | 5.4075E − 21 | −2.6863E − 24 |
| 13 | −1.3451E − 06 | −1.6095E − 10 | 3.5545E − 15 | 1.3710E − 17 | 1.8256E − 21 | −4.8751E − 25 |

First Order Data

| | | | |
|---|---|---|---|
| f/number | 6.00 | Overall Length | 1139.98 |
| Magnification | −0.2400 | Forward Vertex Distance | 433.033 |
| Object Height | −792.50 | Barrel Length | 433.037 |
| Object Distance | −706.944 | Entrance Pupil Distance | 69.1889 |

TABLE 13-continued

| | | | |
|---|---|---|---|
| Effective Focal Length | 163.161 | Exit Pupil Distance | −316.189 |
| Image Distance | −.445997E − 02 | Stop Diameter | 53.758 |
| Stop Surface Number | 6 | Distance to Stop | 0.00 |

First Order Properties of Elements

| Element Number | Surface Numbers | | Power | f' |
|---|---|---|---|---|
| 1 | 1 | 2 | −0.50759E − 02 | −197.01 |
| 2 | 3 | 4 | −0.20634E − 02 | −484.64 |
| 3 | 7 | 8 | 0.10165E − 01 | 98.373 |
| 4 | 9 | 10 | −0.11510E − 01 | −86.880 |
| 5 | 10 | 11 | 0.87048E − 02 | 114.88 |
| 6 | 12 | 13 | 0.73247E − 04 | 13652. |

First-Order Properties of Doublets

| Element Number | Surface Numbers | | Power | f' |
|---|---|---|---|---|
| 4 | 5 | 9 | 11 | −0.20211E − 02 | −494.78 |

First Order Properties of the Lens

Power    f'
0.61289E − 02    163.16
First Order Data, Surf 1 To 4

K
−.744666E − 02
First Order Data, Surf 6 To 13

K
0.804862E − 02
First Order Data, Surf 9 To 13

K
−.188345E − 02

TABLE 14

| Ex. No. | $f_0$ | $f_{U1}$ | $f_{U2}$ | $F_{L1}$ | $f_{L2}$ | $f_{L3}$ | BRL | $CA_{max}$ |
|---|---|---|---|---|---|---|---|---|
| 1 | 83.68 | −77.68 | 69.36 | −127.47 | −230.08 | 239.56 | 114.30 | 81.92 |
| 2 | 122.06 | −118.68 | 105.33 | −180.81 | −405.45 | 673.09 | 180.10 | 125.84 |
| 3 | 122.07 | −117.54 | 105.35 | −179.76 | −399.39 | 411.36 | 175.48 | 124.33 |
| 4 | 121.41 | −104.58 | 102.92 | −165.37 | −346.97 | −6167.50 | 183.32 | 128.15 |
| 5 | 83.41 | −68.66 | 68.39 | −111.80 | −217.00 | 139.31 | 122.24 | 93.98 |
| 6 | 80.59 | −76.35 | 72.82 | −124.70 | −236.86 | 314.16 | 124.29 | 93.84 |
| 7 | 85.72 | −72.99 | 72.83 | −117.93 | −230.65 | 2696.20 | 126.67 | 95.18 |
| 8 | 84.64 | −58.86 | 67.77 | −121.52 | −137.56 | 130.48 | 121.85 | 93.64 |
| 9 | 154.42 | −151.99 | 108.93 | −205.66 | −638.70 | −1324.80 | 168.70 | 110.49 |
| 10 | 153.57 | −161.33 | 112.59 | −157.58 | 11869.00 | −632.42 | 169.96 | 110.79 |
| 11 | 203.87 | −169.91 | 124.22 | −252.36 | −569.75 | −2505.70 | 206.04 | 126.71 |
| 12 | 183.32 | −145.39 | 125.16 | −194.25 | −654.55 | 1907.30 | 206.79 | 131.35 |
| 13 | 163.16 | −134.29 | 124.24 | −197.01 | −484.64 | 13652.00 | 218.73 | 134.10 |

TABLE 15

| Ex. No. | $f_{L3}/f_0$ | $BRL/f_0$ | $CA_{max}/f_0$ |
|---|---|---|---|
| 1 | 2.862811 | 1.365918 | 0.978967 |
| 2 | 5.514419 | 1.475504 | 1.030968 |
| 3 | 3.36987 | 1.437536 | 1.018514 |
| 4 | −50.7989 | 1.509925 | 1.055514 |
| 5 | 1.670183 | 1.465532 | 1.126723 |
| 6 | 3.89825 | 1.542251 | 1.164412 |
| 7 | 31.45357 | 1.477718 | 1.110359 |
| 8 | 1.541588 | 1.439627 | 1.106333 |
| 9 | −8.5792 | 1.092475 | 0.715516 |
| 10 | −4.11812 | 1.106727 | 0.72143 |
| 11 | −12.2907 | 1.010644 | 0.621524 |
| 12 | 10.40421 | 1.128027 | 0.716507 |
| 13 | 83.67247 | 1.340586 | 0.821893 |

TABLE 16

| Ex. No. | $V_{L1}$ | $V_{L2}$ |
|---|---|---|
| 1 | 57.00 | 30.70 |
| 2 | 57.00 | 30.70 |
| 3 | 57.00 | 35.60 |

TABLE 16-continued

| Ex. No. | $V_{L1}$ | $V_{L2}$ |
|---|---|---|
| 4 | 57.00 | 30.70 |
| 5 | 57.00 | 30.70 |
| 6 | 57.00 | 35.60 |
| 7 | 57.00 | 30.70 |
| 8 | 57.00 | 30.70 |
| 9 | 57.00 | 30.70 |
| 10 | 57.00 | 30.70 |
| 11 | 57.00 | 30.70 |
| 12 | 57.00 | 30.70 |
| 13 | 57.00 | 30.70 |

TABLE 17

| Ex. No. | R1L2 | R2L2 | $\phi_{L2/0.7CA}$ | $t_{e/L1}/t_{c/L1}$ | $t_{e/L2}/t_{c/L2}$ | $t_{e/L3}/t_{c/L3}$ |
|---|---|---|---|---|---|---|
| 1 | −133.60 | 164.80 | −1.27789E−02 | 2.64 | 2.20 | 0.72 |
| 2 | −230.30 | 256.00 | −7.95127E−03 | 2.72 | 2.01 | 1.06 |
| 3 | −220.00 | 270.20 | −7.76216E−03 | 2.71 | 1.95 | 0.86 |
| 4 | −287.30 | 203.30 | −7.37210E−03 | 3.20 | 1.96 | 1.41 |
| 5 | −110.60 | 254.40 | −1.19642E−02 | 3.26 | 2.40 | 0.43 |
| 6 | −317.10 | 97.25 | −1.35319E−02 | 3.14 | 2.29 | 0.89 |
| 7 | −173.40 | 130.20 | −1.45457E−02 | 3.30 | 2.43 | 1.26 |
| 8 | −55.52 | 131.80 | −1.50207E−02 | 3.04 | 3.08 | 0.51 |
| 9 | −215.20 | 493.00 | −7.42935E−03 | 2.53 | 1.81 | 1.73 |
| 10 | −289.70 | 984.10 | −6.91879E−03 | 2.94 | 1.58 | 1.94 |
| 11 | −275.90 | 288.60 | −8.22976E−03 | 2.63 | 2.16 | 2.18 |
| 12 | −310.90 | 257.30 | −8.60405E−03 | 3.13 | 2.14 | 1.65 |
| 13 | −309.80 | 175.40 | −1.02088E−02 | 3.05 | 2.48 | 1.93 |

R1L2 and R2L2 are best-fit radii for the aspherical surfaces of the L2 element.
$\phi_{L2/0.7CA}$ is the aspherical optical power of the L2 element calculated at 70% of the L2 element's short conjugate surface.
$t_{e/L1}/t_{c/L1}$, $t_{e/L2}/t_{c/L2}$, and $t_{e/L3}/t_{c/L3}$ are the edge to center thickness ratios for elements L1, L2 and L3, respectively.

TABLE 18

| Ex. No. | $FOV_{LC}(°)$ | $FOV_{SC}(°)$ |
|---|---|---|
| 1 | 90.20 | 57.90 |
| 2 | 90.50 | 59.32 |
| 3 | 90.70 | 58.24 |
| 4 | 91.00 | 57.18 |
| 5 | 92.00 | 60.36 |
| 6 | 92.40 | 55.26 |
| 7 | 92.00 | 57.92 |
| 8 | 92.00 | 57.02 |
| 9 | 86.70 | 71.60 |
| 10 | 86.80 | 71.60 |
| 11 | 87.30 | 70.94 |
| 12 | 93.70 | 67.38 |
| 13 | 91.00 | 63.74 |

What is claimed is:

1. A retrofocus lens having a long conjugate side, a short conjugate side, and an effective focal length $f_0$, said lens, in order from the long conjugate side to the short conjugate side, comprising:

(I) a first lens unit having a negative power, said lens unit, in order from the long conjugate side to the short conjugate side, comprising:

(A) a first lens element L1 composed of an optical material having an Abbe number $v_{L1}$, said element having at least one aspherical surface and an on-axis optical power $\phi_{L1}$; and (B) a second lens element L2 composed of an optical material having an Abbe number $v_{L2}$, said element having at least one aspherical surface and an on-axis optical power $\phi_{L2}$; and (II) a second lens unit having a positive power;

wherein:
(a) the first and second lens units are the only lens units of the retrofocus lens;
(b) the first lens element L1 has a generally meniscus shape which is convex towards the long conjugate;
(c) the second lens element L2 has a biconcave shape when its surface configurations are described by best fit spherical curves;
(d) $\phi_{L1}$, $v_{L1}$, $\phi_{L2}$, and $v_{L2}$ satisfy the relationships:
(i) $\phi_{L1}<0$;
(ii) $|\phi_{L1}|>|\phi_{L2}|$;
(iii) $v_{L2}<v_{L1}$; and
(iv) $v_{L2} \leq 55$; and
(e) the at least one aspherical surface of the second lens element L2 is configured so that the element has an optical power $\phi_{L2/0.7CA}$ at 0.7 of the clear aperture of its short conjugate surface which satisfies the relationships:
$\phi_{L2/0.7CA}<0$, and
$|\phi_{L2/0.7CA}|>|\phi_{L2}|$.

2. The retrofocus lens of claim 1 wherein:
$\phi_{L2}<0$.

3. The retrofocus lens of claim 1 where the lens elements L1 and L2 respectively have center thicknesses $t_{c/L1}$ and $t_{c/L2}$, and edge thicknesses $t_{e/L1}$ and $t_{e/L2}$ which satisfy the relationships:
$t_{e/L1}/t_{c/L1} \leq 3.5$; and
$t_{e/L2}/t_{c/L2} \leq 3.5$;
where the edge thickness in each case is determined at the smaller of the clear apertures of the two optical surfaces of the respective element.

4. The retrofocus lens of claim 3 where $t_{c/L1}$, $t_{c/L2}$, $t_{e/L1}$, and $t_{e/L2}$ satisfy the relationships:
$t_{e/L1}/t_{c/L1} \leq 3.0$; and
$t_{e/L2}/t_{c/L2} \leq 3.0$.

5. The retrofocus lens of claim 1 wherein:
(a) the lens comprises an aperture stop;
(b) the second lens unit, in order from the long conjugate side to the short conjugate side, comprises a first lens subunit having an optical power $\phi_{U2/S1}$ and a second lens subunit having an optical power $\phi_{U2/S2}$, said subunits being the only lens subunits of the second lens unit;
(c) the aperture stop is either within the first lens subunit or is outside of that subunit and spaced from the subunit by an axial distance D, said distance being measured from the lens surface of the first lens subunit that is nearest to the aperture stop;
(d) the second lens subunit comprises:
(i) at least one color-correcting component; and
(ii) a lens element L3 having at least one aspherical surface; and
(e) $\phi_{U2/S1}$, $\phi_{U2/S2}$, and D satisfy the relationships:
(i) $\phi_{U2/S1}>0$;
(ii) $\phi_{U2/S1}>|\phi_{U2/S2}|$; and
(iii) $|D|/f_0 \leq 0.2$.

6. The retrofocus lens of claim 5 where D satisfies the relationship:
$|D|/f_0 \leq 0.1$.

7. The retrofocus lens of claim 5 where the lens elements L1, L2, and L3 respectively have center thicknesses $t_{c/L1}$, $t_{c/L2}$, and $t_{c/L3}$, and edge thicknesses $t_{e/L1}$, $t_{e/L2}$, and $t_{e/L3}$ which satisfy the relationships:

$t_{e/L1}/t_{c/L1} \leq 3.5$;

$t_{e/L2}/t_{c/L2} \leq 3.5$; and $t_{e/L3}/t_{c/L3} \leq 3.5$;

where the edge thickness in each case is determined at the smaller of the clear apertures of the two optical surfaces of the respective element.

8. The retrofocus lens of claim 7 where $t_{c/L1}$, $t_{c/L2}$, $t_{c/L3}$, $t_{e/L1}$, $t_{e/L2}$, and $t_{e/L3}$ satisfy the relationships:

$t_{e/L1}/t_{c/L1} \leq 3.0$;

$t_{e/L2}/t_{c/L2} \leq 3.0$; and $t_{e/L3}/t_{c/L3} \leq 3.0$.

9. The retrofocus lens of claim 5 where the first lens subunit of the second lens unit comprises a single lens element.

10. The retrofocus lens of claim 5 where the color correcting component of the second lens subunit of the second lens unit is a cemented doublet.

11. The retrofocus lens of claim 5 where the L3 element has a focal length $f_3$ which satisfies the relationship:

$|f_{L3}|/f_0 \geq 1.5$.

12. The retrofocus lens of claim 1 where the lens has a full field of view in the direction of the long conjugate which is greater than or equal to 85 degrees.

13. The retrofocus lens of claim 1 wherein the lens has a full field of view in the direction of the short conjugate which is greater than or equal to 50 degrees.

14. The retrofocus lens of claim 1 where the lens has a barrel length BRL which satisfies the relationship:

$BRL/f_0 \leq 1.7$.

15. The retrofocus lens of claim 1 where the lens has a maximum clear aperture $CA_{max}$ which satisfies the relationship:

$CA_{max}/f_0 \leq 1.3$.

16. The retrofocus lens of claim 1 where the lens has a total of six lens elements.

17. A projection lens system comprising:
(a) a pixelized panel; and
(b) the retrofocus lens of claim 1.

18. The projection lens system of claim 17 where the pixelized panel has a diagonal which is greater than or equal to 250 millimeters.

19. The projection lens system of claim 17 further comprising a Fresnel lens between the pixelized panel and the retrofocus lens.

20. The projection lens system of claim 17 further comprising an illumination system which comprises a light source and illumination optics which transfers some of the light from the light source towards the pixelized panel and the retrofocus lens.

21. A retrofocus lens having a long conjugate side, a short conjugate side, an aperture stop, and an effective focal length $f_0$, said lens, in order from the long conjugate side to the short conjugate side, comprising:
(I) a first lens unit having a negative power, said lens unit, in order from the long conjugate side to the short conjugate side, comprising:
(A) a first lens element L1 composed of an optical material having an Abbe number $v_{L1}$, said element having at least one aspherical surface and an on-axis optical power $\phi_{L1}$; and
(B) a second lens element L2 composed of an optical material having an Abbe number $v_{L2}$, said element having at least one aspherical surface and an on-axis optical power $\phi_{L2}$, said at least one aspherical surface being configured so that the element has a negative optical power $\phi_{L2/0.7CA}$ at 0.7 of the clear aperture of its short conjugate surface; and
(II) a second lens unit having a positive power, said lens unit, in order from the long conjugate side to the short conjugate side, comprising:
(A) a first lens subunit having an optical power $\phi_{U2/S1}$ and comprising a single lens element; and
(B) a second lens subunit having an optical power $\phi_{U2/S2}$, said subunit, in order from the long conjugate side to the short conjugate side, comprising:
(i) two lens elements which comprise a color-correcting doublet; and
(ii) a lens element L3 having at least one aspherical surface;

wherein:
(a) the first and second lens units are the only lens units of the retrofocus lens;
(b) the first and second lens elements L1 and L2 are the only lens elements of the first lens unit;
(c) the first and second lens subunits are the only lens subunits of the second lens unit;
(d) the two lens elements comprising a color-correcting doublet and lens element L3 are the only lens elements of the second lens subunit;
(e) the first lens element L1 has a generally meniscus shape which is convex towards the long conjugate;
(f) the second lens element L2 has a biconcave shape when its surface configurations are described by best fit spherical curves;
(g) the aperture stop is either within the first lens subunit or is spaced from that subunit by an axial distance D, said distance being measured from the lens surface of the first lens subunit that is nearest to the aperture stop; and
(h) $\phi_{L1}$, $v_{L1}$, $\phi_{L2}$, $v_{L2}$, $\phi_{U2/S1}$, $\phi_{U2/S2}$, $\phi_{L2/0.7CA}$ and D satisfy the relationships:
(i) $\phi_{L1}<0$;
(ii) $|\phi_{L1}|>|\phi_{L2}|$;
(iii) $v_{L2}<v_{L1}$;
(iv) $v_{L2} \leq 55$;
(V) $\phi_{U2/S1}>0$;
(vi) $\phi_{U2/S1}>|\phi_{U2/S2}|$;
(vii) $|\phi_{L2/0.7CA}|>|\phi_{L2}|$; and
(viii) $|D|/f_0 \leq 0.2$.

22. The retrofocus lens of claim 21 wherein:

$\phi_{L2}<0$.

23. A projection lens system comprising:
(a) a pixelized panel; and
(b) the retrofocus lens of claim 21.

24. The projection lens system of claim 23 further comprising a Fresnel lens between the pixelized panel and the retrofocus lens.

25. The projection lens system of claim 23 further comprising an illumination system which comprises a light source and illumination optics which transfers some of the light from the light source towards the pixelized panel and the retrofocus lens.

* * * * *

UNITED STATES PATENT AND TRADEMARK OFFICE
CERTIFICATE OF CORRECTION

PATENT NO. : 7,002,753 B2
APPLICATION NO. : 10/858777
DATED : February 21, 2006
INVENTOR(S) : Moskovich, Jacob It is certified that error appears in the above-identified patent and that said Letters Patent is hereby corrected as shown below:

Column 1,
Line 48, delete "C1β and C2β" and insert -- C1y and C2y --.

Column 3,
Line 14, delete "high-level" and insert -- high level --.

Column 4,
Line 67, delete "DI/$f_0$<0.1)." and insert -- DI/$f_0$≤0.1). --.

Column 5,
Line 13, delete "11.1);" and insert -- 1.1); --.

Column 6,
Line 4, after "to" insert -- 15 --.
Line 19, delete "tear" and insert -- rear --.

Column 9,
Line 4, delete "cases ≥2.0)," and insert -- cases, ≥2.0), --.
Line 5, delete "1:3" and insert -- 1.3 --.

Columns 9-10,
Table 1, line 1, delete "Aperature" and insert -- Aperture --.
Table 1, line 15, delete "85.4625" and insert -- -85.4625 --.
Table 1, line 19, delete "f Fresnel" and insert -- f – Fresnel --.

Columns 11-12,
Table 2, line 1, delete "Aperature" and insert -- Aperture --.
Table 2, line 19, delete "f Fresnel" and insert -- f – Fresnel --.

Columns 13-14,
Table 3, line 1, delete "Aperature" and insert -- Aperture --.
Table 3, line 19, delete "f Fresnel" and insert -- f – Fresnel --.

Columns 15-16,
Table 4, line 1, delete "Aperature" and insert -- Aperture --.

UNITED STATES PATENT AND TRADEMARK OFFICE
CERTIFICATE OF CORRECTION

PATENT NO. : 7,002,753 B2
APPLICATION NO. : 10/858777
DATED : February 21, 2006
INVENTOR(S) : Moskovich, Jacob It is certified that error appears in the above-identified patent and that said Letters Patent is hereby corrected as shown below:

Columns 17-18,
Table 5, line 1, delete "Aperature" and insert -- Aperture --.

Columns 19-20,
Table 6, line 1, delete "Aperature" and insert -- Aperture --.

Columns 23-24,
Table 7, line 1, delete "Aperature" and insert -- Aperture --.

Columns 25-26,
Table 8, line 1, delete "Aperature" and insert -- Aperture --.

Columns 27-28,
Table 9, line 1, delete "Aperature" and insert -- Aperture --.

Columns 29-30,
Table 10, line 1, delete "Aperature" and insert -- Aperture --.

Columns 31-32,
Table 11, line 1, delete "Aperature" and insert -- Aperture --.

Columns 33-34,
Table 11, line 17, delete "12" and insert -- 13 --.
Table 11, line 18, delete "14" and insert -- 15 --.

Columns 35-36,
Table 12, line 1, delete "Aperature" and insert -- Aperture --.
Table 12, line 26, delete "12" and insert -- 13 --.
Table 12, line 27, delete "14" and insert -- 15 --.

Columns 37-38,
Table 13, line 1, delete "Aperature" and insert -- Aperture --.

Column 41,
Table 18, line 39, delete "$FOV_{LC}(°)$" and insert -- $FOV_{LC}(°)$ --.

Table 18, line 39, delete "$FOV_{SC}(°)$" and insert -- $FOV_{SC}(°)$ --.

UNITED STATES PATENT AND TRADEMARK OFFICE
CERTIFICATE OF CORRECTION

PATENT NO. : 7,002,753 B2
APPLICATION NO. : 10/858777
DATED : February 21, 2006
INVENTOR(S) : Moskovich, Jacob It is certified that error appears in the above-identified patent and that said Letters Patent is hereby corrected as shown below:

Column 43,
Line 5, delete "$t_{c/L3}/t_{c/L3} \leq 3.5$" and insert -- $t_{e/L3}/t_{c/L3} \leq 3.5$ --.
Line 21, delete "$f_3$" and insert -- $f_{L3}$ --.
Line 22, delete "$|f_{L31}|/f_o \geq 1.5$" and insert -- $|f_{L3}|/f_o \geq 1.5$ --.

Column 44,
Line 46, delete "(vi) $\phi_{U2/S1} > |\phi_{U2/S2}|$;" and insert -- (vi) $\phi_{U2/S1} > |\phi_{U2/S2}|$; --.

Signed and Sealed this

Twenty-fifth Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 7,002,753 B2
APPLICATION NO. : 10/858777
DATED : February 21, 2006
INVENTOR(S) : Jacob Moskovich It is certified that error appears in the above-identified patent and that said Letters Patent is hereby corrected as shown below:

In Col. 1, line 48, delete "C1β and C2β" and insert -- C1y and C2y --, therefor.

In Col. 3, line 14, delete "high-level" and insert -- high level --, therefor.

In Col. 4, line 67, delete "$D|f_0<0.1$)." and insert -- $D|/f_0 \leq 0.1$). --, therefor.

In Col. 5, line 13, delete "11.1);" and insert -- 1.1); --, therefor.

In Col. 6, line 4, after "to" insert -- 15 --.

In Col. 6, line 19, delete "tear" and insert --rear --, therefor.

In Col. 9, line 4, delete "cases ≥2.0)," and insert -- cases, ≥2.0), --, therefor.

In Col. 9, line 5, delete "1:3" and insert -- 1.3 --, therefor.

In Cols. 9-10, Table 1, line 1, delete "Aperature" and insert -- Aperture --, therefor.

In Cols. 9-10, Table 1, line 15, delete "85.4625" and insert -- -85.4625 --, therefor.

In Cols. 9-10, Table 1, line 19, delete "f Fresnel" and insert -- f – Fresnel --, therefor.

UNITED STATES PATENT AND TRADEMARK OFFICE
CERTIFICATE OF CORRECTION

PATENT NO. : 7,002,753 B2
APPLICATION NO. : 10/858777
DATED : February 21, 2006
INVENTOR(S) : Jacob Moskovich It is certified that error appears in the above-identified patent and that said Letters Patent is hereby corrected as shown below:

In Cols. 11-12, Table 2, line 1, delete "Aperature" and insert -- Aperture --, therefor.

In Cols. 11-12, Table 2, line 19, delete "f Fresnel" and insert -- f – Fresnel --, therefor.

In Cols. 13-14, Table 3, line 1, delete "Aperature" and insert -- Aperture --, therefor.

In Cols. 13-14, Table 3, line 19, delete "f Fresnel" and insert -- f – Fresnel --, therefor.

In Cols. 15-16, Table 4, line 1, delete "Aperature" and insert -- Aperture --, therefor.

In Cols. 17-18, Table 5, line 1, delete "Aperature" and insert -- Aperture --, therefor.

In Cols. 19-20, Table 6, line 1, delete "Aperature" and insert -- Aperture --, therefor.

In Cols. 23-24, Table 7, line 1, delete "Aperature" and insert -- Aperture --, therefor.

In Cols. 25-26, Table 8, line 1, delete "Aperature" and insert -- Aperture --, therefor.

In Cols. 27-28, Table 9, line 1, delete "Aperature" and insert -- Aperture --, therefor.

In Cols. 29-30, Table 10, line 1, delete "Aperature" and insert -- Aperture --, therefor.

In Cols. 31-32, Table 11, line 1, delete "Aperature" and insert -- Aperture --, therefor.

In Cols. 33-34, Table 11, line 17, delete "12" and insert -- 13 --, therefor.

In Cols. 33-34, Table 11, line 18, delete "14" and insert -- 15 --, therefor.

In Cols. 35-36, Table 12, line 1, delete "Aperature" and insert -- Aperture --, therefor.

In Cols. 35-36, Table 12, line 26, delete "12" and insert -- 13 --, therefor.

UNITED STATES PATENT AND TRADEMARK OFFICE
CERTIFICATE OF CORRECTION

| | |
|---|---|
| PATENT NO. | : 7,002,753 B2 |
| APPLICATION NO. | : 10/858777 |
| DATED | : February 21, 2006 |
| INVENTOR(S) | : Jacob Moskovich |

It is certified that error appears in the above-identified patent and that said Letters Patent is hereby corrected as shown below:

In Cols. 35-36, Table 12, line 27, delete "14" and insert -- 15 --, therefor.

In Cols. 37-38, Table 13, line 1, delete "Aperature" and insert -- Aperture --, therefor.

In Col. 41, Table 18, line 39, delete "$FOV_{LC}(°)$" and insert -- $FOV_{LC}(°)$ --, therefor.

In Col. 41, Table 18, line 39, delete "$FOV_{sc}(°)$" and insert -- $FOV_{SC}(°)$ --, therefor.

In Col. 43, line 5, in Claim 7, delete "$t_{c/L3}/t_{c/L3} \leq 3.5$" and insert -- $t_{e/L3}/t_{c/L} \leq 3.5$ --, therefor.

In Col. 43, line 21, in Claim 11, delete "$f_3$" and insert -- $f_{L3}$ --, therefor.

In Col. 43, line 22, in Claim 11, delete "$|f_{L3l}|/f_o \geq 1.5$ and insert -- $|f_{L3}|/f_o \geq 1.5$ --, therefor.

In Col. 44, line 46, in Claim 21, delete "(vi)  $\phi_{U2/S1} > |\phi_{U2/S2}|$;" and insert -- (vi)  $\phi_{U2/S1} > |\phi_{U2/S2}|$; --, therefor.

Signed and Sealed this

Eighth Day of January, 2008

JON W. DUDAS
*Director of the United States Patent and Trademark Office*